(12) United States Patent
Pursifull et al.

(10) Patent No.: US 8,550,058 B2
(45) Date of Patent: Oct. 8, 2013

(54) FUEL RAIL ASSEMBLY INCLUDING FUEL SEPARATION MEMBRANE

(75) Inventors: Ross Dykstra Pursifull, Dearborn, MI (US); Mark Allen Dearth, Dearborn, MI (US); Tom G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1676 days.

(21) Appl. No.: 11/962,683

(22) Filed: Dec. 21, 2007

(65) Prior Publication Data
US 2009/0159057 A1    Jun. 25, 2009

(51) Int. Cl.
*F02B 13/00* (2006.01)
*F02M 37/00* (2006.01)

(52) U.S. Cl.
USPC ....... 123/575; 123/1 A; 123/406.45; 123/304; 123/198 R; 123/295

(58) Field of Classification Search
USPC ......... 123/1 A, 267, 295, 299, 304, 344, 402, 123/406.3, 406.31, 698, 445, 468, 515, 523, 123/524, 456, 575
See application file for complete search history.

(56) References Cited

U.S. PATENT DOCUMENTS

| | | |
|---|---|---|
| 2,101,554 A | 12/1937 | Meyer |
| 2,221,405 A | 11/1940 | Nallinger |
| 3,589,348 A | 6/1971 | Reichhelm |
| 3,794,000 A | 2/1974 | Hodgkinson |
| 3,826,234 A | 7/1974 | Cinquegrani |
| 4,031,864 A | 6/1977 | Crothers |
| 4,122,803 A | 10/1978 | Miller |
| 4,136,652 A | 1/1979 | Lee |
| 4,205,650 A | 6/1980 | Szwarcbier |

(Continued)

FOREIGN PATENT DOCUMENTS

| | | |
|---|---|---|
| CN | 1536203 A | 10/2004 |
| DE | 19954979 A1 | 6/2001 |

(Continued)

OTHER PUBLICATIONS

Office Action of Chinese Application No. 200610148453.4, Issued Mar. 24, 2011, State Intellectual Property Office of PRC, 9 Pages.

(Continued)

*Primary Examiner* — Lindsay Low
*Assistant Examiner* — Kevin Lathers
(74) *Attorney, Agent, or Firm* — Julia Voutyras; Alleman Hall McCoy Russell & Tuttle LLP

(57) ABSTRACT

As one example, a fuel rail assembly for supplying pressurized fuel to a plurality of cylinders of an engine is provided. The fuel rail assembly includes a fuel rail housing defining an internal fuel rail volume having at least a first region and a second region; a fuel separation membrane element disposed within the fuel rail housing that segregates the first region from the second region. The membrane element can be configured to pass a first component of a fuel mixture such as an alcohol through the membrane element from the first region to the second region at a higher rate than a second component of the fuel mixture such as a hydrocarbon. The separated alcohol and hydrocarbon components can be provided to the engine in varying relative amounts based on operating conditions.

38 Claims, 9 Drawing Sheets

(56) References Cited

U.S. PATENT DOCUMENTS

| | | | |
|---|---|---|---|
| 4,210,103 A | 7/1980 | Dimitroff et al. |
| 4,256,075 A | 3/1981 | Fukui et al. |
| 4,311,118 A | 1/1982 | Slagle |
| 4,325,329 A | 4/1982 | Taylor |
| 4,331,121 A | 5/1982 | Stokes |
| 4,385,593 A | 5/1983 | Brooks |
| 4,402,296 A | 9/1983 | Schwarz |
| 4,411,243 A | 10/1983 | Hardenberg et al. |
| 4,480,616 A | 11/1984 | Takeda |
| 4,489,596 A | 12/1984 | Linder et al. |
| 4,495,930 A | 1/1985 | Nakajima |
| 4,499,885 A | 2/1985 | Weissenbach et al. |
| 4,502,453 A | 3/1985 | Kabasin et al. |
| 4,519,341 A | 5/1985 | McGarr |
| 4,541,383 A | 9/1985 | Jessel |
| 4,558,665 A | 12/1985 | Sandberg et al. |
| 4,590,904 A | 5/1986 | Wannenwetsch |
| 4,648,367 A | 3/1987 | Gillbrand et al. |
| 4,664,091 A | 5/1987 | Royer |
| 4,706,630 A | 11/1987 | Wineland et al. |
| 4,810,929 A | 3/1989 | Strumbos |
| 4,817,576 A | 4/1989 | Abe et al. |
| 4,930,537 A | 6/1990 | Farmer |
| 4,945,881 A | 8/1990 | Gonze et al. |
| 4,962,789 A | 10/1990 | Benscoter |
| 4,993,386 A | 2/1991 | Ozasa et al. |
| 4,993,388 A | 2/1991 | Mitsumoto |
| 4,998,518 A | 3/1991 | Mitsumoto |
| 5,017,826 A | 5/1991 | Oshima et al. |
| 5,018,483 A | 5/1991 | Kashima et al. |
| 5,044,331 A | 9/1991 | Suga et al. |
| 5,044,344 A | 9/1991 | Tuckey et al. |
| 5,050,555 A | 9/1991 | Mitsumoto |
| 5,056,490 A | 10/1991 | Kashima |
| 5,056,494 A | 10/1991 | Kayanuma |
| 5,060,610 A | 10/1991 | Paro |
| 5,097,803 A | 3/1992 | Galvin |
| 5,111,795 A | 5/1992 | Thompson |
| 5,131,228 A | 7/1992 | Mochizuki et al. |
| 5,150,683 A | 9/1992 | Depa et al. |
| 5,174,247 A | 12/1992 | Tosa et al. |
| 5,188,087 A | 2/1993 | Saito |
| 5,193,508 A | 3/1993 | Motoyama et al. |
| 5,204,630 A | 4/1993 | Seitz et al. |
| 5,230,309 A | 7/1993 | Suga et al. |
| 5,233,944 A | 8/1993 | Mochizuki |
| 5,241,933 A | 9/1993 | Morikawa |
| 5,335,637 A | 8/1994 | Davis et al. |
| 5,336,396 A | 8/1994 | Shetley |
| 5,357,908 A | 10/1994 | Sung et al. |
| 5,360,034 A | 11/1994 | Der Manuelian |
| 5,408,979 A | 4/1995 | Backlund et al. |
| 5,417,239 A | 5/1995 | Ford |
| 5,469,830 A | 11/1995 | Gonzalez |
| 5,477,836 A | 12/1995 | Hyodo et al. |
| 5,508,582 A | 4/1996 | Sugimoto et al. |
| 5,515,280 A | 5/1996 | Suzuki |
| 5,560,344 A | 10/1996 | Chan |
| 5,565,157 A | 10/1996 | Sugimoto et al. |
| 5,694,908 A | 12/1997 | Hsu |
| 5,713,336 A | 2/1998 | King et al. |
| 5,722,362 A | 3/1998 | Takano et al. |
| 5,740,784 A | 4/1998 | McKinney |
| 5,782,092 A | 7/1998 | Schultalbers et al. |
| 5,806,500 A | 9/1998 | Fargo et al. |
| 5,875,743 A | 3/1999 | Dickey |
| 5,887,566 A | 3/1999 | Glauber et al. |
| 5,921,222 A | 7/1999 | Freeland |
| 5,979,400 A | 11/1999 | Nishide |
| 6,017,646 A | 1/2000 | Prasad et al. |
| 6,035,837 A | 3/2000 | Cohen et al. |
| 6,042,955 A | 3/2000 | Okamoto |
| 6,112,705 A | 9/2000 | Nakayama et al. |
| 6,112,725 A | 9/2000 | McKinney |
| 6,119,637 A | 9/2000 | Matthews et al. |
| 6,189,516 B1 | 2/2001 | Hei Ma |
| 6,213,086 B1 | 4/2001 | Chmela et al. |
| 6,229,253 B1 | 5/2001 | Iwata et al. |
| 6,234,123 B1 | 5/2001 | Iiyama et al. |
| 6,237,339 B1 | 5/2001 | Asen et al. |
| 6,318,083 B1 | 11/2001 | Machida et al. |
| 6,325,039 B1 | 12/2001 | Goto |
| 6,332,448 B1 | 12/2001 | Ilyama et al. |
| 6,344,246 B1 | 2/2002 | Fischer et al. |
| 6,371,151 B1 | 4/2002 | Saylor |
| 6,382,225 B1 | 5/2002 | Tipton |
| 6,467,470 B1 | 10/2002 | Carlsson et al. |
| 6,494,192 B1 | 12/2002 | Capshaw |
| 6,505,579 B1 | 1/2003 | Lee |
| 6,553,974 B1 | 4/2003 | Wickman et al. |
| 6,617,769 B2 | 9/2003 | Suzuki |
| 6,619,242 B2 | 9/2003 | Kaneko |
| 6,622,663 B2 | 9/2003 | Weissman et al. |
| 6,622,664 B2 | 9/2003 | Holder et al. |
| 6,622,690 B2 | 9/2003 | Ando et al. |
| 6,651,432 B1 | 11/2003 | Gray, Jr. |
| 6,659,068 B2 | 12/2003 | Urushihara et al. |
| 6,681,739 B2 | 1/2004 | Mamiya et al. |
| 6,684,849 B2 | 2/2004 | zur Loye et al. |
| 6,691,669 B2 | 2/2004 | Surnilla et al. |
| 6,698,387 B1 | 3/2004 | McFarland et al. |
| 6,711,893 B2 | 3/2004 | Ueda et al. |
| 6,792,966 B2 | 9/2004 | Harvey |
| 6,805,107 B2 | 10/2004 | Vinyard |
| 6,845,616 B2 | 1/2005 | Jauss |
| 6,866,950 B2 | 3/2005 | Connor et al. |
| 6,928,983 B2 | 8/2005 | Mashiki |
| 6,951,202 B2 | 10/2005 | Oda |
| 6,959,693 B2 | 11/2005 | Oda |
| 6,972,093 B2 | 12/2005 | Partridge et al. |
| 6,978,762 B2 | 12/2005 | Mori |
| 6,988,485 B2 | 1/2006 | Ichise et al. |
| 6,990,956 B2 | 1/2006 | Niimi |
| 7,011,048 B2 | 3/2006 | Gurin et al. |
| 7,013,844 B2 | 3/2006 | Oda |
| 7,055,500 B2 | 6/2006 | Miyashita et al. |
| 7,082,926 B2 | 8/2006 | Sadakane et al. |
| 7,107,942 B2 | 9/2006 | Weissman et al. |
| 7,159,568 B1 | 1/2007 | Lewis et al. |
| 7,178,503 B1 | 2/2007 | Brehob |
| 7,225,787 B2 * | 6/2007 | Bromberg et al. ........ 123/198 A |
| 7,255,080 B1 | 8/2007 | Leone |
| 7,261,064 B2 | 8/2007 | Bhaisora et al. |
| 7,278,396 B2 | 10/2007 | Leone et al. |
| 7,287,492 B2 | 10/2007 | Leone et al. |
| 7,287,509 B1 | 10/2007 | Brehob |
| 7,293,552 B2 | 11/2007 | Leone et al. |
| 7,350,504 B2 | 4/2008 | Yasunaga et al. |
| 7,367,317 B2 | 5/2008 | Miyazaki et al. |
| 7,373,931 B2 | 5/2008 | Lennox et al. |
| 7,406,947 B2 | 8/2008 | Lewis et al. |
| 7,428,895 B2 | 9/2008 | Leone et al. |
| 7,444,987 B2 | 11/2008 | Cohn et al. |
| 7,454,285 B2 | 11/2008 | Christie et al. |
| 7,487,631 B2 | 2/2009 | Cueman et al. |
| 7,493,879 B2 | 2/2009 | Fujii et al. |
| 7,493,897 B2 | 2/2009 | Arakawa et al. |
| 7,556,023 B2 | 7/2009 | Ilhoshi et al. |
| 7,584,740 B2 | 9/2009 | Boyarski |
| 7,594,498 B2 | 9/2009 | Lewis et al. |
| 7,637,250 B2 | 12/2009 | Bromberg et al. |
| 7,640,913 B2 | 1/2010 | Blumberg et al. |
| 7,640,914 B2 | 1/2010 | Lewis et al. |
| 7,640,915 B2 | 1/2010 | Cohn et al. |
| 7,676,321 B2 | 3/2010 | Andri |
| 7,694,666 B2 | 4/2010 | Lewis et al. |
| 7,703,446 B2 | 4/2010 | Bromberg et al. |
| 7,721,710 B2 | 5/2010 | Leone et al. |
| 7,726,265 B2 | 6/2010 | Bromberg et al. |
| 7,765,982 B2 | 8/2010 | Lewis et al. |
| 7,789,063 B2 | 9/2010 | Lewis et al. |
| 7,849,842 B1 | 12/2010 | Lewis et al. |
| 7,869,930 B2 | 1/2011 | Stein et al. |
| 7,886,729 B2 | 2/2011 | Russell et al. |

(56) References Cited

U.S. PATENT DOCUMENTS

| | | | |
|---|---|---|---|
| 7,900,933 B2 | 3/2011 | Tones et al. | |
| 7,913,668 B2 | 3/2011 | Lewis et al. | |
| 7,942,128 B2 | 5/2011 | Leone et al. | |
| 7,971,575 B2 | 7/2011 | Lewis et al. | |
| 8,028,678 B2 | 10/2011 | Stein | |
| 8,065,979 B2 | 11/2011 | Leone et al. | |
| 2001/0035215 A1 | 11/2001 | Tipton et al. | |
| 2002/0139111 A1 | 10/2002 | Ueda et al. | |
| 2002/0139321 A1* | 10/2002 | Weissman et al. | 123/1 A |
| 2003/0089337 A1 | 5/2003 | Cohn et al. | |
| 2003/0127072 A1 | 7/2003 | Gmelin et al. | |
| 2004/0035395 A1 | 2/2004 | Heywood et al. | |
| 2004/0065274 A1 | 4/2004 | Cohn et al. | |
| 2004/0083717 A1 | 5/2004 | Zhu et al. | |
| 2004/0149644 A1 | 8/2004 | Partridge et al. | |
| 2004/0250790 A1 | 12/2004 | Heywood et al. | |
| 2004/0261763 A1 | 12/2004 | Hashimoto et al. | |
| 2005/0051135 A1 | 3/2005 | Tomoda et al. | |
| 2005/0066939 A1 | 3/2005 | Shimada et al. | |
| 2005/0097888 A1 | 5/2005 | Miyashita | |
| 2005/0103285 A1 | 5/2005 | Oda | |
| 2005/0109285 A1 | 5/2005 | Oda | |
| 2005/0109319 A1 | 5/2005 | Oda | |
| 2005/0155577 A1 | 7/2005 | Ichise et al. | |
| 2005/0155578 A1 | 7/2005 | Ichise et al. | |
| 2005/0166896 A1 | 8/2005 | Sadakane et al. | |
| 2005/0172931 A1 | 8/2005 | Mori | |
| 2005/0178356 A1 | 8/2005 | Shibagaki | |
| 2005/0178360 A1 | 8/2005 | Satou | |
| 2005/0183698 A1 | 8/2005 | Yonezawa | |
| 2005/0274353 A1 | 12/2005 | Okubo et al. | |
| 2006/0016429 A1 | 1/2006 | Mashiki | |
| 2006/0075991 A1 | 4/2006 | Heywood et al. | |
| 2006/0090732 A1 | 5/2006 | Shibagaki | |
| 2006/0102136 A1 | 5/2006 | Bromberg et al. | |
| 2006/0102145 A1 | 5/2006 | Cohn et al. | |
| 2006/0102146 A1 | 5/2006 | Cohn et al. | |
| 2006/0180099 A1 | 8/2006 | Aimoto et al. | |
| 2006/0191727 A1* | 8/2006 | Usami et al. | 180/65.2 |
| 2007/0028861 A1 | 2/2007 | Kamio et al. | |
| 2007/0028905 A1 | 2/2007 | Shinagawa | |
| 2007/0034192 A1 | 2/2007 | Kamio et al. | |
| 2007/0119391 A1 | 5/2007 | Fried et al. | |
| 2007/0119392 A1 | 5/2007 | Leone et al. | |
| 2007/0119394 A1 | 5/2007 | Leone | |
| 2007/0119411 A1 | 5/2007 | Kerns | |
| 2007/0119412 A1 | 5/2007 | Leone et al. | |
| 2007/0119413 A1 | 5/2007 | Lewis et al. | |
| 2007/0119414 A1 | 5/2007 | Leone et al. | |
| 2007/0119415 A1 | 5/2007 | Lewis et al. | |
| 2007/0119416 A1 | 5/2007 | Boyarski | |
| 2007/0119421 A1 | 5/2007 | Lewis et al. | |
| 2007/0119422 A1 | 5/2007 | Lewis et al. | |
| 2007/0119425 A1 | 5/2007 | Lewis et al. | |
| 2007/0204813 A1 | 9/2007 | Arai et al. | |
| 2007/0215069 A1 | 9/2007 | Leone | |
| 2007/0215071 A1 | 9/2007 | Dearth et al. | |
| 2007/0215072 A1 | 9/2007 | Dearth et al. | |
| 2007/0215101 A1 | 9/2007 | Russell et al. | |
| 2007/0215102 A1 | 9/2007 | Russell et al. | |
| 2007/0215104 A1 | 9/2007 | Hahn | |
| 2007/0215110 A1 | 9/2007 | Stein et al. | |
| 2007/0215111 A1 | 9/2007 | Surnilla | |
| 2007/0215125 A1 | 9/2007 | Dearth et al. | |
| 2007/0215127 A1 | 9/2007 | Dearth et al. | |
| 2007/0215130 A1 | 9/2007 | Shelby et al. | |
| 2007/0219679 A1 | 9/2007 | Coulmeau | |
| 2007/0219701 A1 | 9/2007 | Hashimoto et al. | |
| 2007/0221163 A1 | 9/2007 | Kamio | |
| 2007/0234976 A1 | 10/2007 | Dearth et al. | |
| 2007/0289573 A1 | 12/2007 | Leone et al. | |
| 2007/0295307 A1 | 12/2007 | Kerns | |
| 2008/0092851 A1 | 4/2008 | Arakawa et al. | |
| 2008/0288158 A1 | 11/2008 | Leone | |
| 2009/0065409 A1 | 3/2009 | Kamio et al. | |
| 2009/0095546 A1 | 4/2009 | Zubeck et al. | |
| 2009/0178654 A1 | 7/2009 | Leone et al. | |
| 2010/0006050 A1 | 1/2010 | Bromberg et al. | |
| 2010/0288232 A1 | 11/2010 | Bromberg et al. | |
| 2011/0247586 A1 | 10/2011 | Zubeck et al. | |
| 2012/0028758 A1 | 2/2012 | Stein | |

FOREIGN PATENT DOCUMENTS

| | | |
|---|---|---|
| EP | 1057988 | 1/2006 |
| JP | 59068535 A | 4/1984 |
| JP | 61065066 | 4/1986 |
| JP | 62210229 A | 9/1987 |
| JP | 01195926 A | 8/1989 |
| JP | 02070968 A | 3/1990 |
| JP | 3111664 A | 5/1991 |
| JP | 5163976 A | 6/1993 |
| JP | 7019124 A | 1/1995 |
| JP | 2002227730 A | 8/2002 |
| JP | 2005146973 A | 6/2005 |
| JP | 2007/0756754 | 3/2007 |
| JP | 200882258 A | 4/2008 |
| RU | 2031238 | 3/1995 |
| WO | 9739235 A1 | 10/1997 |
| WO | WO 2004/097198 | 11/2004 |
| WO | 2006/023313 | 3/2006 |
| WO | WO 2006/055540 | 5/2006 |
| WO | WO 2007/106354 | 9/2007 |
| WO | WO 2007/106416 | 9/2007 |

OTHER PUBLICATIONS

Unknown Author, "Honda Making Significant Progress on HCCI Engine for Hybrid Application," http://www.greencarcongress.com/2005/10/honda_making_si.html, Oct. 28, 2005, 8 pages.

Kamio, J. et al., "Study on HCCI-SI Combustion Using Fuels Containing Ethanol," SAE Technical Papers Series No. 2007-01-4051, Powertrain & Fluid Systems Conference & Exhibition, Rosemont IL., Oct. 29-Nov. 1, 2007, 12 pages.

Leone, Thomas G. et al., "Fuel System for Multi-Fuel Engine," U.S. Appl. No. 12/184,064, filed Jul. 31, 2008, 40 pages.

Leone, Thomas G. et al., "On Board Water Addition for Fuel Separation System," U.S. Appl. No. 12/117,167, filed May 8, 2008, 25 pages.

ISA/UK, Intellectual Property Office Search Report of GB 0822341. 4, Mar. 10, 2009, United Kingdom, 2 pages.

U.S. Appl. No. 60/780,319, filed Mar. 8, 2006, Bromberg et al.
U.S. Appl. No. 11/682,372, filed Mar. 6, 2007, Bromberg et al.
U.S. Appl. No. 11/782,050, filed Jul. 24, 2007, Bromberg et al.
U.S. Appl. No. 60/781,598, filed Mar. 10, 2006, Blumberg et al.
U.S. Appl. No. 11/683,564, filed Mar. 8, 2007, Bromberg et al.
U.S. Appl. No. 60/780,981, filed Mar. 10, 2006, Cohn et al.
U.S. Appl. No. 11/684,100, filed Mar. 9, 2007, Cohn et al.
U.S. Appl. No. 60/790,715, filed Apr. 10, 2006, Bromberg et al.
U.S. Appl. No. 60/746,507, filed May 5, 2006, Cohn et al.
U.S. Appl. No. 60/747,865, filed May 22, 2006, Heywood et al.
U.S. Appl. No. 60/832,836, filed Jul. 24, 2006, Bromberg et al.
U.S. Appl. No. 60/948,753, filed Jul. 10, 2007, Bromberg et al.
U.S. Appl. No. 60/973,499, filed Sep. 19, 2007, Bromberg.
U.S. Appl. No. 11/923,418, filed Oct. 24, 2007, Leone et al.
U.S. Appl. No. 11/924,395, filed Oct. 25, 2007, Brehob.
U.S. Appl. No. 11/464,172, filed Aug. 11, 2006, Stein.
U.S. Appl. No. 11/871,496, filed Oct. 12, 2007, Zubeck et al.
U.S. Appl. No. 11/955,246, filed Dec. 12, 2007, Pursifull et al.
U.S. Appl. No. 11/566,131, filed Dec. 1, 2006, Blumberg et al.
U.S. Appl. No. 11/776,120, filed Jul. 11, 2007, Stein et al.
U.S. Appl. No. 12/014,952, filed Jan. 16, 2008, Leone et al.

D.R. Crohn et al., "Direct Injection Ethanol Boosted Gasoline Engines: Biofuel Leveraging for Cost Effective Reduction of Oil Dependence and CO2 Emissions", Mar. 15, 2005, Massachusetts Institute of Techonology.

L. Bromberg et al., "Calculations of Knock Suppressions in Highly Turbocharged Gasoline/Ethanol Engines Using Direct Ethanol Injection", Jul. 7, 2005, Massachusetts Institute of Technology.

(56) References Cited

OTHER PUBLICATIONS

Stephen Russ, "A Review of the Effect of Engine Operating Conditions on Borderline Knock", SAE Technical Paper Series 960497, Feb. 26-29, 1996.

S. Brusca et al., "Water Injection in IC—SI Engines to Control Detonation and to Reduce Pollutant Emissions", SAE Technical Paper No. 2003-01-1912, May 19-22, 200.

Hunter, M. Park, "1962 Oldsmobile Jetfire," originally appeared in Special Interest Autos, Apr. 1996, http://www.tctc.com/~park/mph/pageCLIP/page62JET/62jet.htm, Nov. 7, 2006.

Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.

Australian examiner's first report on patent application No. 2007202600, Australian Government, IP Australia, Nov. 3, 2011, 2 pages.

Donald J. Lewis et al., "Event Based Engine Control System and Method," U.S. Appl. No. 13/415,634, filed Mar. 8, 2012, 126 pages.

Ross Dykstra Pursifull et al., "On-Board Fuel Vapor Separartion for Multi-Fuel Vehicle," U.S. Appl. No. 13/398,754, filed Feb. 16, 2012, 53 pages.

Thomas G. Leone et al., "On-Board Water Addition for Fuel Separation System," U.S. Appl. No. 13/302,280, filed Nov. 22, 2011, 25 pages.

\* cited by examiner

FUEL RAIL ASSEMBLY INCLUDING FUEL SEPARATION MEMBRANE

BACKGROUND AND SUMMARY

Internal combustion engines utilizing two or more different fuels have been proposed. As one example, the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. describe engines that are capable of using multiple fuels. Specifically, the Heywood et al. papers describe directly injecting ethanol into the engine cylinders to improve charge cooling effects, while relying on port injected gasoline to providing a majority of the combusted fuel over a drive cycle. The ethanol, in this example, can provide increased octane and increased charge cooling due to its higher heat of vaporization in comparison to gasoline, thereby reducing knock limits on boosting and/or compression ratio. This approach purports to improve fuel economy and increase utilization of renewable fuels.

The inventors of the present disclosure have recognized that requiring a user to re-fuel the engine system with two or more separate fuels (e.g., gasoline and ethanol), in order to achieve the advantages described by Heywood et al., can be burdensome. As one approach, United States printed publication number 2006/0191727 by Usami et al. describes an electric power generation system that includes a fuel storage unit having an ethanol permeable membrane for separating the ethanol from a mixed fuel including ethanol and gasoline. This publication describes how ethanol separation can be performed in proportion to the pressure difference across the permeable membrane and also according to the temperature difference across the membrane.

However, the inventors herein have recognized a variety of issues associated with the approach taken by Usami et al. As one example, the inventors have recognized that engine packaging constraints on-board a vehicle may preclude the addition of a fuel separator or may reduce the effective size of the separator. A reduction in the separator size can reduce fuel separation rates, which may in turn impair engine performance where the fuel to be separated is temporarily unavailable or available in a reduced amount due to the reduced separation rate. As another example, the use of a dedicated heater as taught by Usami et al. to improve the separation rate by way of heat addition is also limited by the similar packaging constraints.

To address these and other issues, the inventors herein have provided a fuel rail assembly for supplying pressurized fuel to a plurality of cylinders of an engine. As one example, the fuel rail assembly comprises a fuel rail housing defining an internal fuel rail volume having at least a first region and a second region; a fuel separation membrane element disposed within the fuel rail housing and segregating the first region from the second region, said membrane element configured to pass a first component of a fuel mixture through the membrane element from the first region to the second region at a higher rate than a second component of the fuel mixture; a fuel inlet disposed on the fuel rail housing, said fuel inlet configured to admit the fuel mixture to the first region; a plurality of fuel outlets disposed on the fuel rail housing, wherein each of said fuel outlets are configured to supply at least a portion of the fuel mixture from the first region to a respective one of said plurality of engine cylinders; and at least one membrane outlet disposed on the fuel rail housing and configured to supply at least a portion of the first component that has passed through the membrane element from the second region to a location external the fuel rail housing.

By placing the fuel separation membrane within the fuel rail assembly, which is in relative close proximity to the engine, the fuel separation membrane and the fuel mixture to be separated by the membrane can be at least partially heated by the engine. In this way, the fuel separation rate can be increased without requiring a separate heater, thereby reducing cost and other associated packaging constraints. Further, in this way, it is possible to utilize a fuel pump to pressurize fuel for injection to the engine, as well as for improved separation of the fuel mixture.

The inventors herein have also recognized that the fuel separation rate can be further increased by increasing the surface area of the fuel separation membrane relative to the volume of the separator. As one example, the surface area of the membrane may be increased for a given separator volume by supporting the membrane on a substrate that forms a non-planar membrane element within the fuel rail, such as a tube. By supplying the pressurized fuel to the external surface of the tubular membrane element, the substrate can be loaded in compression, which can provide an additional strength advantage for some substrate materials such as ceramics or other materials that are relatively stronger when loaded in compression than tension.

The inventors herein have also recognized that a plurality of separate membrane elements within a common fuel rail assembly can further increase the separation rate for a given separator volume. For example, by utilizing multiple smaller tubes for the membrane elements, the ring stress in the substrate can be reduced, thereby enabling a further reduction in wall thickness of the substrate. A reduction in wall thickness and increased surface area of the membrane elements can further increase the fuel separation rate while also reducing packaging constraints. These and other advantages will be appreciated in light of the following specification and accompanying drawings.

In still another embodiment, a method of operating a fuel system for an internal combustion engine may be used, comprising: supplying a pressurized fuel mixture to a fuel rail, said fuel mixture including a hydrocarbon component and an alcohol component; separating at least a portion of the alcohol component from the fuel mixture by passing at least said portion of the alcohol component through a fuel separation membrane element disposed within the fuel rail to obtain an alcohol reduced fuel mixture; delivering the alcohol reduced fuel mixture from the fuel rail to at least a plurality of cylinders of the engine via injectors fluidly coupled with the first fuel rail; and supplying the separated alcohol component to the engine. In this way, it is possible to utilize a fuel pump to pressurize fuel for injection to the engine, as well as for improved separation of the fuel mixture.

DETAILED DESCRIPTION

Figure 1:
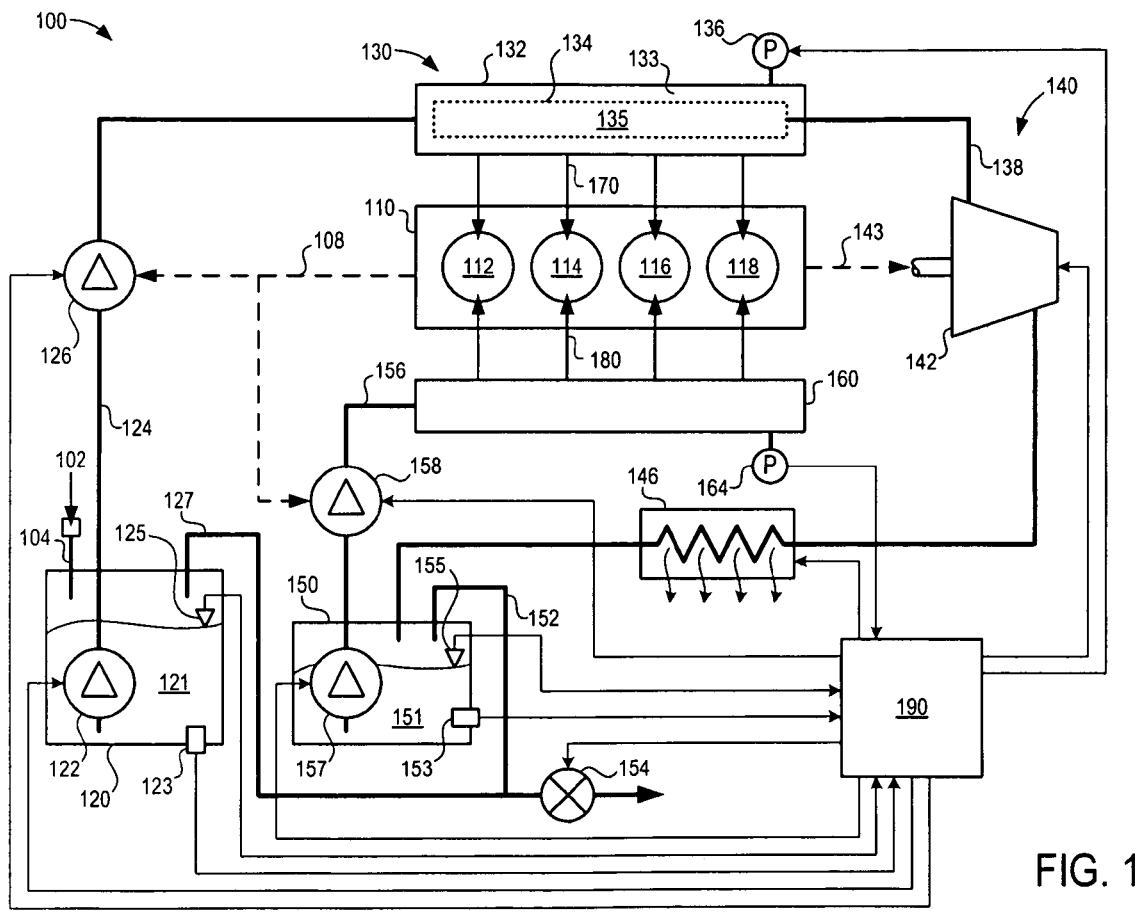
FIG. 1 shows a schematic depiction of an example fuel system for an engine.

FIG. 1 shows a schematic depiction of an example fuel system 100 for a fuel burning engine 110. As one non-limiting example, engine 110 can be configured as an internal combustion engine that is configured on-board a vehicle as part of a propulsion system. However, engine 110 can include other engine types and can be configured in other suitable applications. In this particular example, engine 110 includes four combustion chambers or cylinders indicated at 112, 114, 116, and 118. In other examples, engine 110 may include any suitable number of cylinders. Engine 110 will be described in greater detail with reference to FIGS. 2 and 3.

In this example, each cylinder of engine 110 can receive at least two separate fuels having different compositions in varying relative amounts based on operating conditions. Thus, each engine cylinder can receive a first fuel as indicated at 170 via a first fuel rail assembly 130 and can receive a second fuel indicated at 180 via a second fuel rail 160. As one example, the first fuel provided to the engine at 170 can include a higher concentration of at least one component than the second fuel provided to the engine at 180. Similarly, the second fuel can include a higher concentration of at least one other component than the first fuel. For example, the first fuel provided to the engine via fuel rail assembly 130 can include a higher concentration of a hydrocarbon component (e.g. gasoline, diesel, etc.) than the second fuel provided to the engine via fuel rail 160, while the second fuel can include a higher concentration of an alcohol component (e.g. ethanol, methanol, etc.) than the first fuel. As will be described in greater detail with reference to FIGS. 8 and 10, the relative amounts of these two fuels that are delivered to the engine can be varied by control system 190 in response to operating conditions.

These first and second fuels can be separated from a fuel mixture 121 on-board the vehicle before being delivered to the engine. Fuel mixture 121 can be provided to a fuel tank 120 during a refueling operation indicated at 102 via fuel passage 104. The fuel mixture can include any suitable mixture of hydrocarbon and alcohol components. For example, the fuel mixture may include E10 (a mixture of approximately 10% ethanol and 90% gasoline by volume), E85 (a mixture of approximately 85% ethanol and 15% gasoline by volume), M10 (a mixture of approximately 10% methanol and 90% gasoline by volume), M85 (a mixture of approximately 85% methanol and 15% gasoline volume), a mixture including gasoline, methanol and ethanol, or other mixtures of alcohol and gasoline. Furthermore, with regard to the above examples, diesel may replace gasoline, or the fuel mixture may include two or more hydrocarbon fuels and an alcohol. Further still, in some examples, the fuel mixture may include water in addition to an alcohol and/or a hydrocarbon. Control system 190 can receive an indication of the composition of fuel mixture 121 via fuel sensor 123, including alcohol concentration, hydrocarbon concentration, etc. Control system 190 can also receive an indication of the amount of the fuel mixture contained within storage tank 120 via sensor 125.

The fuel mixture can be provided to fuel rail assembly 130 from fuel tank 120 via fuel passage 124. Fuel passage 124 may include one or more intermediate fuel pumps. In this particular example, fuel passage 124 includes a lower pressure pump 122 and a higher pressure pump 126. During operation of engine 110, control system 190 can adjust operation of pump 122 and/or pump 126 to provide the fuel mixture to fuel rail assembly 130 at any suitable pressure and/or flow rate in response to feedback received from pressure sensor 136. As one example, the pressure of the fuel mixture supplied to the fuel rail assembly 130 may be adjustable between a pressure of 4 bar and 200 bar. However, other injection pressures may be used. In some examples, low pressure fuel pump 122 can be powered by an electric motor, whereby control system 190 can adjust the level of pump work provided by pump 122 by varying the amount of electrical power that is provided to the pump motor from an energy source stored on-board the vehicle (not shown). In some examples, high pressure fuel pump 126 can be powered directly by a mechanical output of engine 110 as indicated at 108, such as via a crankshaft or camshaft of the engine. Control system 190 can adjust the pump work provided by pump 126 by varying the effective volume of each pump stroke. While separate pumps 122 and 126 have been presented in FIG. 1, in other examples, a single pump can be used to provide the fuel mixture to fuel rail assembly 130. As described in further detail herein, one or more of the fuel pumps may be adjusted to vary a pressure of fuel delivered to the engine, as well as separation pressure, based on an exhaust gas oxygen amount, altitude, and/or humidity. In this way, the rate of separation, for example, may be adjusted responsive to operating conditions.

In this example, fuel rail assembly 130 includes a fuel rail housing 132 that defines a first fuel mixture receiving region 133, where the fuel mixture is initially received from fuel passage 124. Fuel rail assembly 130 can also include a fuel separation membrane element 134 further defining a second region 135 separate from region 133. Membrane element 134 can include a selectively permeable membrane element that permits at least one component of the fuel mixture to pass through the membrane element from region 133 to region 135 at a greater rate than at least one other component of the fuel mixture.

As one non-limiting example, the membrane element can be configured to permit at least an alcohol component of the fuel mixture to permeate through the membrane element from region 133 to region 135. However, in some examples, the membrane element may also permit a hydrocarbon component of the fuel mixture to permeate the membrane element at a substantially lower rate than the alcohol component. The term permeant may be used herein to describe the fuel component or components that permeate the membrane element into region 135. In this way, membrane element 134 can provide a fuel separation function, whereby the permeant can include a higher concentration of the alcohol component and a lower concentration of the hydrocarbon component than the initial fuel mixture due in part to the selectivity of the membrane element.

Figure 4:
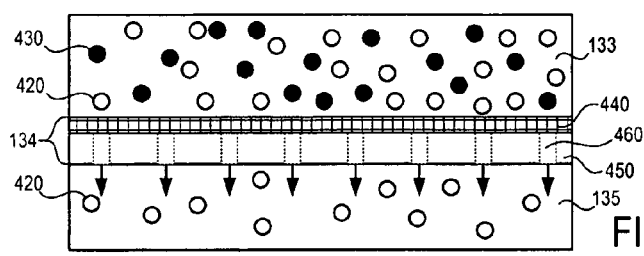
FIG. 4 shows a schematic depiction of an example fuel separation process.

In some examples, permeation of the permeant can utilize a process that may be referred to as pervaporation. Pervaporation can include a combination of membrane element permeation and evaporation of the permeant from the membrane element interface with region 135. Referring also to FIG. 4, a first component 420 (e.g. an alcohol component) can pass through membrane element 134 by sorption at a first membrane element interface with region 133 followed by diffusion of the component across the membrane element, and finally desorption of the component into a vapor phase at a second membrane element interface with region 135. Thus, the fuel mixture including components 420 and 430 can be received at region 133 in a liquid phase (e.g. fuel mixture 121) and component 420 (e.g. an alcohol such as ethanol or methanol) can pass through membrane element 134 where it can be initially received at region 135 in a vapor phase. Component 430 (e.g. the hydrocarbon component) can be retained within region 133 by the membrane element. However, it should be appreciated that some membrane elements may permit at least some hydrocarbon components to permeate the membrane element material into region 135, while still providing fuel separation functionality.

FIG. 4 further illustrates how membrane element 134 can include a selectively permeable membrane coating 440 forming a layer that is supported on a membrane substrate 450. Substrate 450 can form a support structure that enables the membrane element to withstand compressive force from the pressurized fuel mixture applied to external membrane coating 440 as indicated at 133. In some examples, membrane coating 440 can be relatively more flexible than substrate 450.

Membrane coating 440 may include a polymer and/or other suitable material that permits the alcohol component to permeate through the membrane coating at a higher rate than the hydrocarbon component. For example, membrane coating 440 may include polyethersulfone that contains both polar and nonpolar characteristics, with the polar interaction dominant to the outer layer of the membrane coating (e.g. the interface between membrane element 134 and region 133), which permits alcohol to permeate the membrane coating to a greater extent than the hydrocarbons. Additionally or alternatively, membrane coating 440 may include a nanofiltration material that utilizes molecule size exclusion and/or chemical selectivity to separate the alcohol component from the hydrocarbon component of the fuel mixture.

Substrate 450 can form a rigid porous tube that defines region 135 for receiving the permeant. As one non-limiting example, substrate 450 can comprise zirconia ceramic material or other suitable material having pores 460 that permit at least an alcohol component of the fuel mixture to pass from region 133 to region 135. A ceramic material may be selected for the substrate since it has the property of being relatively strong in compression, and is relatively heat resistant. By supplying the higher pressure fuel mixture to the exterior of the membrane element including the membrane coating and a ceramic substrate, the ceramic substrate is advantageously loaded and can support the more flexible membrane coating.

The rate of transport of a particular fuel mixture component across the membrane element can be dependent on a variety of factors, including the pressure gradient across the membrane element (e.g. pressure difference between regions 133 and 135), a temperature of the membrane coating and fuel mixture, and a concentration gradient of the permeant component across the membrane element (e.g. between regions 133 and 135). By increasing the pressure gradient across the membrane element, the temperature of the fuel rail assembly, and/or the concentration gradient across the membrane element, the separation rate of the fuel mixture can be increased. Conversely, by reducing the pressure gradient across the membrane element, the temperature of the fuel rail assembly, and/or the concentration gradient across the membrane element, the separation rate of the fuel mixture can be reduced.

Thus, in some example, the control system can vary the pressure gradient across the membrane element in order to adjust the separation rate of the permeant (e.g. the alcohol component) from the fuel mixture. For example, the control system can increase or decrease the fuel mixture pressure supplied to region 133 of fuel rail assembly 130 by respectively increasing or decreasing the pump work provided by pumps 122 and/or 126. Additionally or alternatively, the control system can decrease or increase the pressure within region 135 of the fuel rail assembly by respectively increasing or decreasing the amount of pump work provided by vapor compressor 142. In some examples, vapor compressor 142 may apply a partial vacuum to region 135 to maintain the permeant in a vapor phase until it is condensed by condensation system 140. Adjustment to the operation of vapor compressor 142 can also adjust the removal rate of the permeant from region 135, which in turn affects the concentration gradient across the membrane element.

The placement of the fuel separation membrane element within the fuel rail provides several advantages. First, the increase in the fuel mixture pressure provided to fuel rail assembly 130 via pumps 122 and/or 126 can be used to advantage to promote permeation of the alcohol component of the fuel mixture through the membrane element. In this way, a separate fuel pump is not required for the fuel separation operation and the fuel injection system. Second, the fuel rail assembly can be positioned at a suitable orientation and/or proximity to the engine to receive heat generated during the combustion process. The temperature of the fuel rail assembly near the cylinder head can be substantially higher than ambient air temperature, for example, the temperature near the cylinder head can be approximately 400K. In this way, a separate fuel heater is not required for promoting separation of the alcohol and hydrocarbon components of the fuel mixture. Third, fuel rail assembly 130 including the fuel separation membrane element can provide a more compact fuel separation system from an engine packaging standpoint.

Due to the pervaporation process, the permeant can evaporate from the membrane element interface with region 135 to form a vapor. A condensation system 140 fluidly coupled with region 135 via vapor passage 138 can be provided to assist with the removal of the permeant vapor from region 135 of the fuel rail assembly and can condense the permeant vapor into a liquid phase for subsequent delivery to the engine via fuel rail 160. Note that in an alternative embodiment, the permeant vapor may be delivered to the engine intake manifold in vapor form to be ingested by the cylinders for combustion. Further manifold vacuum may be applied to further improve the separation and delivery to the cylinder of the vapor.

In one example, condensation system 140 includes vapor compressor 142 and a heat exchanger 146. Vapor compressor 142 can be powered by a mechanical input from the engine via the crankshaft or camshaft as indicated at 143. Alternatively, vapor compressor 142 can be powered by an electric motor from an on-board power supply such as a battery or alternator. Heat exchanger 146 can be operated to extract heat from the permeate vapor enabling it to condense to a liquid phase, where it may be collected at a permeant storage tank 150 as indicated at 151. Heat exchanger 146 can be configured to utilize any suitable working fluid for removing heat from the permeant, including ambient air, engine coolant, or other suitable coolant. In some examples, the amount of heat extracted from the permeant can be adjusted by the control system by increasing or decreasing the temperature and/or flow rate of the working fluid. The heat exchanger 146 and/or compressor 142 may be adjusted, for example, responsive to the amount of separation, concentration of alcohol before and/or after separation, engine operation, exhaust air-fuel ratio, exhaust oxygen content, etc.

In some examples, vapor passage 138 may include a valve that can be opened and closed by the control system to vary the rate at which the permeant is removed from region 135. As one example, the control system may close the valve to reduce the rate of fuel separation as well as reducing the condensation of the permeant at storage tank 150. In this way, the control system can regulate the amount of permeant that is available to the engine via fuel rail 160.

Permeant tank 150 can include a fuel sensor 153 for providing an indication of the composition of the condensed permeant fuel 151. For example, sensor 153 can provide an indication of the alcohol concentration of fuel 151 to control system 190. Permeant tank 150 can also include a fuel level sensor 155 for providing an indication of the amount of fuel 151 contained within the permeant tank. In some examples, control system 190 can adjust the separation rate at fuel rail assembly 130 in response to an amount and/or concentration of fuel 151 stored within tank 150. For example, the control system can increase the separation rate of the permeant if the amount of the permeant fuel stored within tank 150 is below a threshold. Conversely, the control system can reduce the separation rate or discontinue separation of the permeant if the amount of fuel stored in tank 150 is greater than a threshold. Furthermore, the control system can also increase or decrease the condensation rate provided by condensation system 140 in response to the rate of separation.

Permeant 151 can be supplied to fuel rail 160 via one or more fuel pumps by way of fuel passage 156. For example, a lower pressure pump 157 can be powered by an electric motor, while a higher pressure fuel pump 158 can be powered directly by a mechanical output of engine 110 as indicated at 108. However, in some examples, fuel passage 156 may include only one fuel pump.

FIG. 1 further illustrates how fuel tanks 120 and 150 can include respective vapor passages 127 and 152 for purging fuel vapors that develop in the ullage space of these tanks. Vapor passages 127 and 152 can communicate with an air intake passage of the engine via a valve 154, as shown in greater detail by FIG. 3. The control system can adjust the position of valve 154 to increase or decrease the flow rate of fuel vapors to the engine. In some examples, vapor passages 127 and 152 can communicate with the air intake passage of the engine via separate valves.

While FIG. 1 shows a configuration where the fuel mixture entering the fuel rail assembly is not returned to fuel tank 120, in other examples, the alcohol reduced fuel retained by the membrane element can be returned to the fuel tank. For example, where the alcohol separation via the membrane element is relatively rapid relative to the rate of injection of the alcohol reduced fuel, at least a portion of the alcohol reduced fuel can be circulated back to fuel tank 120 via a recirculation passage (not shown).

Figure 2:
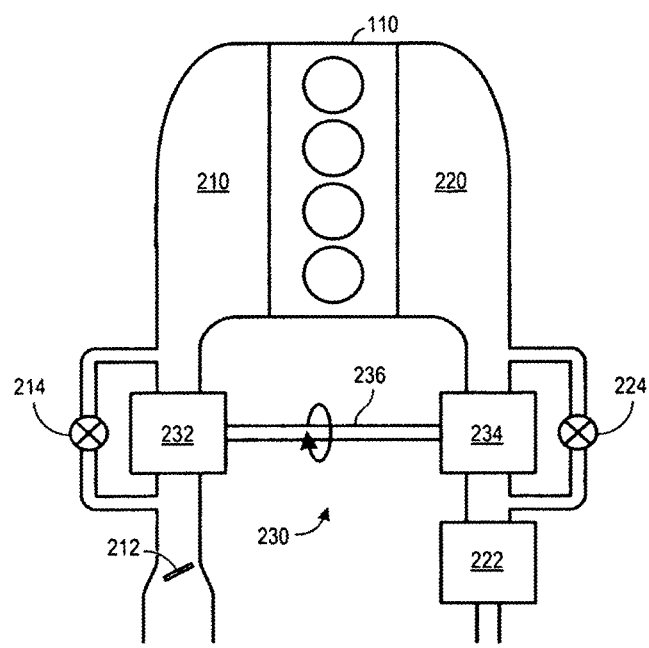
FIG. 2 shows a schematic depiction of an example air intake and exhaust system for an engine.

Referring now to FIG. 2, a schematic depiction of an example air intake and exhaust system for engine 110 is shown. Intake air can be provided to engine 110 via an air intake manifold 210 and products of combustion can be exhausted from the engine via exhaust manifold 220. Intake air can be provided to intake manifold 210 via intake throttle 212 and exhaust gases that are provided to exhaust manifold 220 can be treated by an exhaust catalyst 222. A boosting device such as turbocharger 230 can be provided, which includes a compressor 232 configured to provide boosted intake air to intake manifold 210, and an exhaust gas turbine 234 configured to extract exhaust energy from the exhaust gases flowing from engine 110. Turbine 234 can be rotationally coupled with compressor 232 via a shaft 236. Note that in other examples, compressor 232 can be instead driven by engine 110 or by an electric motor while turbine 234 can be omitted. A compressor bypass valve 214 can be provided to enable intake air to bypass the compressor under select operating conditions. Similarly, a turbine bypass valve 224 can be provided to enable exhaust gases to bypass the turbine under select operating conditions. Control system 190 can adjust the position of valves 214 and 224 to respectively bypass compressor 232 and turbine 234.

Figure 3:
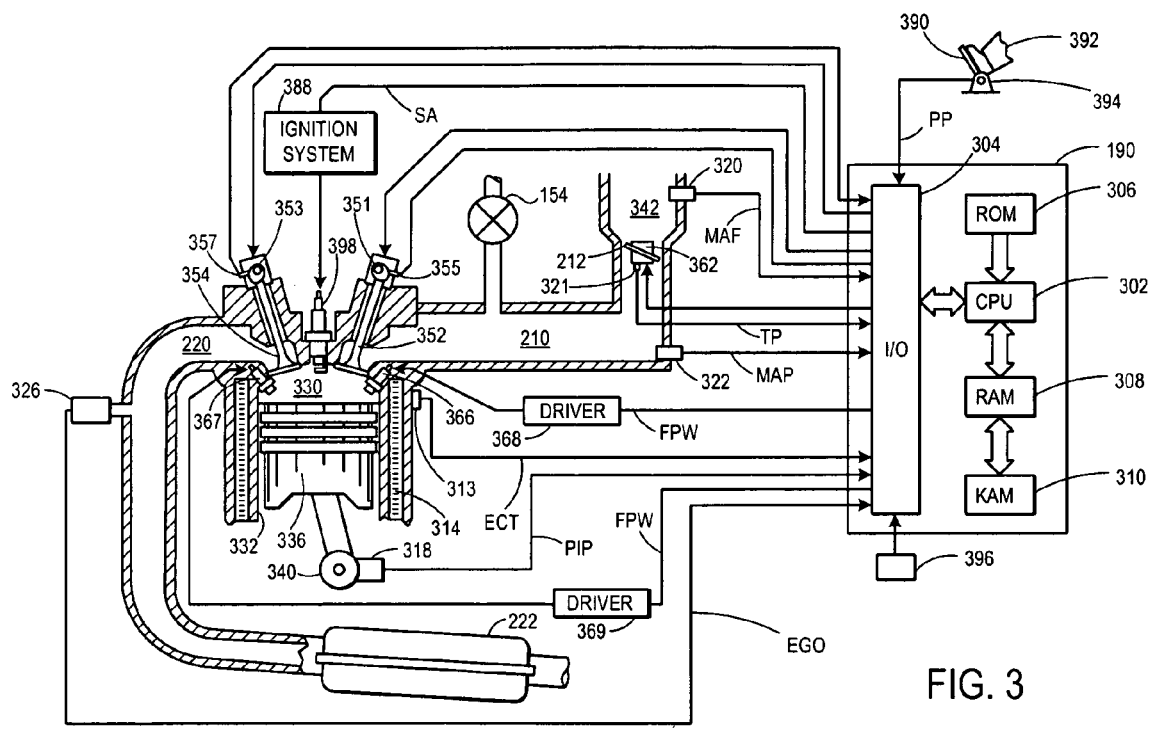
FIG. 3 shows a schematic depiction of an example cylinder of an internal combustion engine.

FIG. 3 shows a schematic depiction of an example cylinder of internal combustion engine 110, as well as the intake and exhaust paths connected to the cylinder. In the embodiment shown in FIG. 3, the example cylinder or combustion chamber 330 can receive two different fuels via two different injectors 366 and 367. Cylinder 330 can be any of cylinders 112, 114, 116, and 118 previously described in FIG. 1.

As one example, injector 366 can provide a first fuel to the cylinder as indicated at 170 in FIG. 1, while injector 367 can provide a second fuel to the cylinder as indicated at 180 in FIG. 1. Thus, fuel injector 366 can be fluidly coupled with region 133 of fuel rail assembly 130 and fuel injector 367 can be fluidly coupled with fuel rail 160. Thus, as one non-limiting example, injector 367 can provide the permeant fuel to the cylinder, including a greater concentration of alcohol than the initial fuel mixture, and injector 366 can provide the portion of the fuel mixture that was retained within region 133 of the fuel rail assembly by the membrane element. Therefore, injector 366 can provide a fuel having a greater concentration of hydrocarbons and a lower concentration of alcohol than the fuel provided by injector 367.

By adjusting the relative amounts of the two different fuels provided by injectors 366 and 367, it is possible to take advantage of the increased charge cooling properties provided by the alcohol component of the permeant fuel to thereby reduce the tendency of knock. This phenomenon, combined with increased compression ratio, boosting and/or engine downsizing, can then be used to obtain large fuel economy benefits (by reducing the knock limitations on the engine) and/or large increases in engine performance. As will be described in greater detail with reference to FIGS. 8 and 10, the amount of the alcohol rich permeant fuel provided to the engine can be increased in order to reduce engine knock.

While FIG. 3 shows an example where both of fuel injectors 366 and 367 are configured as in-cylinder direct injectors for each cylinder of the engine, in other examples, at least one of injectors 366 and 367 may be configured as a port injector and the other as a direct injector. For example, injector 366 may be arranged in an air intake passage of the engine and injector 367 may be arranged as an in-cylinder injector.

Cylinder 330 of engine 110 is defined at least partially by combustion chamber walls 332 and further by piston 336 positioned therein. Piston 336 can be connected to crankshaft 340. A starter motor (not shown) may be coupled to crankshaft 340 via a flywheel (not shown), or alternatively direct engine starting may be used. In one particular example, piston 336 may include a recess or bowl (not shown) to help in forming stratified charges of air and fuel, if desired. However, in an alternative embodiment, a flat piston may be used.

Cylinder, 330 is shown communicating with intake manifold 210 and exhaust manifold 220 via respective intake valve 352 and exhaust valve 354. Note that each cylinder of engine 110 can include two or more intake valves and/or two or more exhaust valves. Cylinder 330 can have a compression ratio, which may be defined as the ratio of volumes when piston 336 is at bottom center to when piston 336 is at top center. In one example, the compression ratio may be approximately 9:1. However, in some examples where different fuels are used, the compression ratio may be increased. For example, it may be between 10:1 and 11:1 or 11:1 and 12:1, or greater.

Fuel injector 366 is shown directly coupled to combustion chamber 330 for delivering injected fuel directly therein in proportion to the pulse width of signal FPW received from control system 190 via electronic driver 368. While FIG. 3 shows injector 366 as a side injector, it may also be located overhead of the piston, such as near the position of spark plug 398. Alternatively, the injector may be located overhead and near the intake valve to improve mixing. Fuel may also be delivered to cylinder 330 via fuel injector 367. Fuel injector 367 is shown directly coupled to combustion chamber 330 for delivering injected fuel directly therein in proportion to the pulse width of signal FPW received from control system 190 via electronic driver 369. While FIG. 3 shows injector 367 as a side injector, it may also be located overhead of the piston, such as near the position of spark plug 398. Alternatively, the injector may be located overhead and near the intake valve to improve mixing. Such a position may improve mixing and combustion due to the lower volatility of some alcohol based fuels.

Intake manifold 210 is shown communicating with throttle body 342 via throttle plate 212. In this particular example, throttle plate 212 is moveably coupled to electric motor 362 so that the position of elliptical throttle plate 212 can be controlled by control system 190 via electric motor 362. This configuration may be referred to as electronic throttle control (ETC), which can also be utilized, for example, during idle speed control. In an alternative embodiment (not shown), a bypass air passageway can be arranged in parallel with throttle plate 212 to control inducted airflow during idle speed control via an idle control by-pass valve positioned within the air passageway.

Exhaust gas sensor 326 is shown coupled to exhaust manifold 220 upstream of catalytic converter 222. Sensor 326 may be any suitable sensor for providing an indication of exhaust gas air/fuel ratio, including a linear oxygen sensor, a UEGO, a two-state oxygen sensor, an EGO, a HEGO, or an HC or CO sensor. In this particular example, sensor 326 is a two-state oxygen sensor that provides signal EGO to control system 190 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Additionally, sensor 326 can provide feedback to the control system to enable a prescribed ratio of the first and second fuels to be delivered to the engine.

Distributorless ignition system 388 can provide an ignition spark to combustion chamber 330 via spark plug 398 in response to spark advance signal SA from control system 190. Control system 190 may cause combustion chamber 330 to operate in a variety of combustion modes, including a homogeneous air/fuel mode and a stratified air/fuel mode by controlling injection timing, injection amounts, spray patterns, etc. Control system 190 can independently control the amount of fuel delivered to the cylinder by fuel injectors 366 and 367 so that the homogeneous, stratified, or combined homogenous/stratified air/fuel mixture in chamber 330 can be selected to be at stoichiometry, a value rich of stoichiometry, or a value lean of stoichiometry.

As previously described with reference to FIG. 1, internal combustion engine 110, including a plurality of combustion chambers, can be controlled by a control system 190. As one example, control system 190 can be configured as an electronic engine controller and may include a microcomputer, including microprocessor unit 302, input/output ports 304, an electronic storage medium for executable programs and calibration values shown as read only memory (ROM) chip 306 in this particular example, random access memory (RAM) 308, keep alive memory (KAM) 310, communicating via a data bus. Control system 190 is shown receiving various signals from sensors coupled to engine 110, in addition to those signals previously discussed, including measurement of inducted mass air flow (MAF) from mass air flow sensor 320 coupled to throttle body 342; engine coolant temperature (ECT) from temperature sensor 313 coupled to cooling sleeve 314; a profile ignition pickup signal (PIP) from Hall effect sensor 318 coupled to crankshaft 340; and throttle position TP from throttle position sensor 321; absolute Manifold Pressure Signal MAP from sensor 322; an indication of engine knock from knock sensor 396; and an indication of requested engine torque from vehicle operator 392 by pedal 390 via pedal position sensor 394. These and other sensors can provide an indication of operating conditions to the control system. Engine speed signal RPM can be generated by control system 190 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 318, which is also used as an engine speed sensor, produces a predetermined number of equally spaced pulses every revolution of the crankshaft.

Continuing with FIG. 3, a variable camshaft timing system is shown for controlling the operation of valves 352 and 354. For example, cam shaft 351 can control the opening and closing timing of intake valve 352. A cam timing sensor 355 can provide an indication of intake valve timing to control system 190. A cam shaft 353 can control the opening and closing timing of exhaust valve 354. A cam timing sensor 357 can provide an indication of exhaust valve timing to control system 190. In some examples, valve timing can be adjusted by a variable cam timing system that can vary the rotational relationship between the cam shafts and the crankshaft of the engine. In this way, the intake and/or exhaust valve timings can be adjusted relative to the position of the piston. Furthermore in some examples, cam profile switching may be used to enable the control system to vary the timing and/or lift of the valves. Further still, in alternative embodiments, valves 352 and/or 354 may be controlled by electromagnetic valve actuators.

Figure 5:
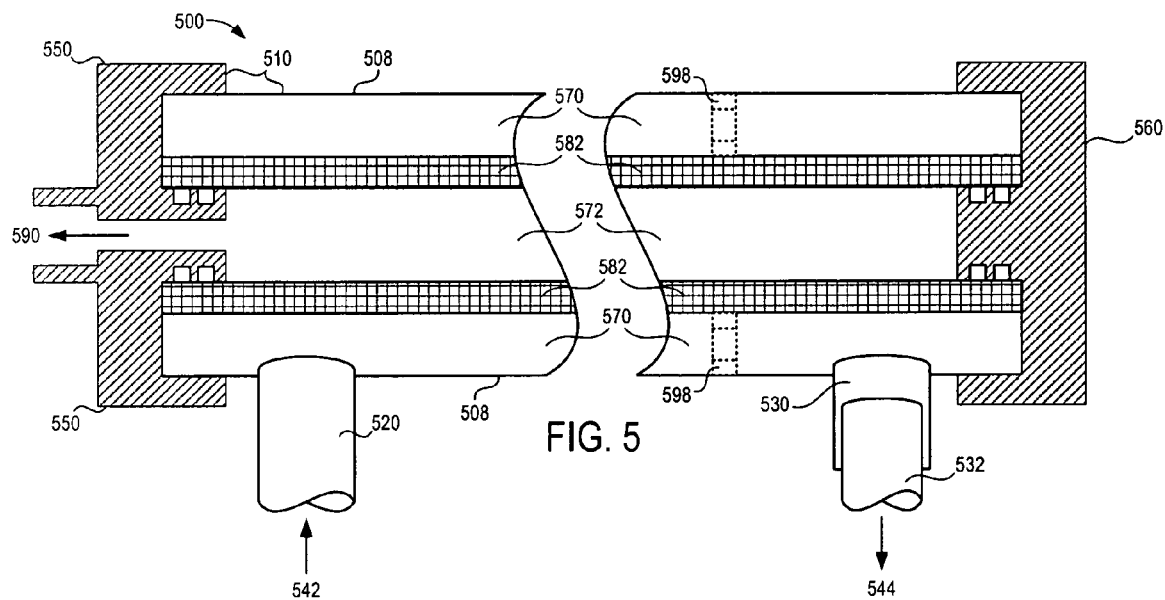
FIG. 5 shows a schematic depiction of a first example of a fuel rail assembly including a fuel separation membrane element.

Referring now to FIG. 5, a non-limiting example of fuel rail assembly 500 is shown. Fuel rail assembly 500 can represent fuel rail assembly 130 previously described with reference to FIG. 1. Fuel rail assembly 500 can include a fuel rail housing 510 that defines a fuel mixture receiving region 570 for receiving the fuel mixture. Region 570 of 500 can represent region 133 of fuel rail assembly 130. In this example, fuel rail housing 510 includes fuel rail wall 508 and end caps 550 and 560. However, in other examples, end caps 550 and 560 can be formed integrally with the fuel rail wall. End caps 550 and 560 can serve as both sealing plugs for the ends of the fuel rail assembly as well as supporting the ends of the membrane element and internal membrane element support structure.

Fuel rail housing 510 further includes a fuel inlet port 520, which can be used to supply a fuel mixture to region 570 as indicated by arrow 542. Fuel rail housing 510 can further include one or more outlet ports, one of which is shown at 530. In this particular example, outlet port 530 can be fluidly coupled with a fuel injector, a fuel receiving end of which is shown at 532. Fuel injector 532 can deliver fuel to at least one cylinder of the engine. For example, injector 532 can represent injector 366 shown in FIG. 3. In other examples, the fuel outlet port may provide fuel to two or more cylinders of the engine. For example, a plurality of injectors may receive fuel from a single outlet of the rail so that substantially equal fuel composition may be delivered to the injectors.

Fuel injector 532 can be configured as a port injector or alternatively as a direct injector, as shown in FIG. 3, for example. While only a single outlet port is shown in this example, it should be appreciated that fuel rail assembly 130 can include two or more fuel outlet ports that may be each fluidly coupled with a fuel injector. For example, as shown in FIG. 1, fuel rail assembly 130 can include at least four fuel outlet ports that each service separate engine cylinders via their respective fuel injectors. Thus, in some examples, the fuel rail assembly may include the same number of fuel outlet ports as engine cylinders. However, where the engine includes two fuel rail assemblies 130 for servicing separate banks of engine cylinders (e.g. for a twin bank V-8 engine), each fuel rail assembly may include a number of fuel outlet ports equivalent to the number of cylinders that are serviced by the fuel rail assembly.

Fuel separation membrane element 582 shown in FIG. 5 can represent membrane element 134 that was previously described with reference to FIGS. 1 and 4. In this particular example, region 572 is partially defined by membrane element 582 and is further defined by end caps 550 and 552. End cap 550 further includes an opening or port for permitting the permeant to be removed from region 572 of the fuel rail assembly. For example, as shown in FIG. 1, the permeant can be removed from region 135 via vapor passage 138 and as shown in FIG. 1, fuel may be supplied to fuel inlet port 520 via fuel passage 124.

In some examples, membrane element 582 may be supported or held in position within housing 510 by one or more supports located at prescribed intervals along the longitudinal length of the membrane element as indicated generally at 598. The supports illustrated external to the membrane element at 598 are in contrast to substrate 450 that was described with reference to FIG. 4. However, in some examples, support 598 can be integrally formed with the substrate of the membrane element. An example cross section of support 598 is shown in FIG. 7.

Figure 6:
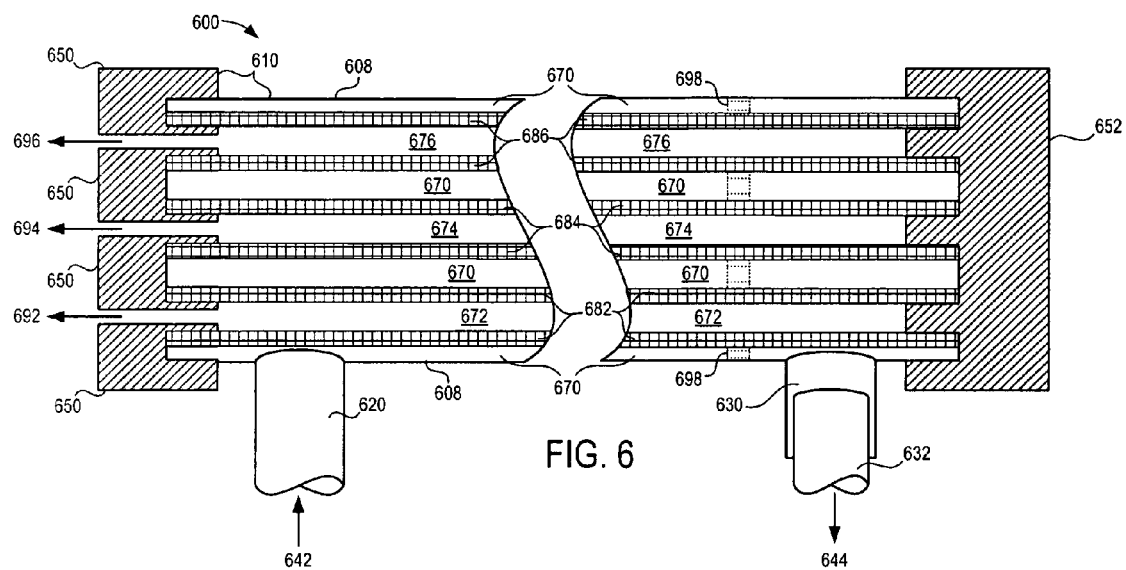
FIG. 6 shows a schematic depiction of a second example of a fuel rail assembly including a plurality of fuel membrane elements.

FIG. 6 shows a fuel rail assembly 600 as an alternative embodiment of fuel rail assembly 500. In this particular example, fuel rail assembly 600 includes a plurality of fuel separation membrane elements 682, 684, and 686 forming respective regions 672, 674, and 676 for receiving the permeant. Collectively regions 672, 674, and 676 can represent region 135 shown in FIG. 1. While this example will be described as including a plurality of distinct membrane elements, it should be appreciated that these membrane elements can form a membrane element system, and can in some instances be supported within the fuel rail assembly by a common support structure.

Fuel rail assembly 600 is shown including a fuel rail housing 610 having at least one inlet port 620 for receiving a mixed fuel as indicated at 642 and one or more fuel outlet ports, an example of which is shown at 630. Fuel outlet port 630 can be fluidly coupled with a fuel injector 632, for delivering fuel to at least one cylinder of the engine. Note that fuel rail assembly 600 can include an outlet port for each cylinder serviced by the fuel rail assembly. Injector 632 can represent injector 366 shown in FIG. 3.

A fuel mixture receiving region 670 within the fuel rail assembly is at least partially defined by fuel rail housing 610. Region 670 can represent region 133 shown in FIG. 1. Fuel rail housing 610 in this example includes fuel rail wall 608 and end caps 650 and 652. Note that while fuel rail assembly has been shown to include a fuel rail housing having end caps, in other examples, the end caps may integrally formed with the fuel rail wall. In this way, the fuel rail housing can comprise one or more portions for purposes of manufacturing.

As shown in FIG. 6, fuel rail assembly 610 can include two or more fuel separation membrane elements defining two or more independent fuel separation regions. For example, fuel rail assembly 610 in this example, includes a first separation membrane element 682 defining a fuel separation region 672, a second separation membrane element 684 defining a fuel separation region 674, and a third separation membrane element 686 defining a fuel separation region 676. Thus, in this example, fuel rail assembly 610 includes three distinct fuel separation membrane elements. In some examples, these fuel separation membrane elements can be supported and/or held in position within the fuel rail housing by one or more supports indicated generally at 698. The supports may be provided at prescribed intervals along the longitudinal length of the membrane elements. FIG. 7 shows an example cross section of support 698.

In this example, end cap 650 includes a plurality of openings for dispensing permeant from regions 672, 674, and 676 as shown respectively at 692, 694, and 696. These openings can each be fluidly coupled with a common vapor passage, such as vapor passage 138 of FIG. 1.

Figure 7A:
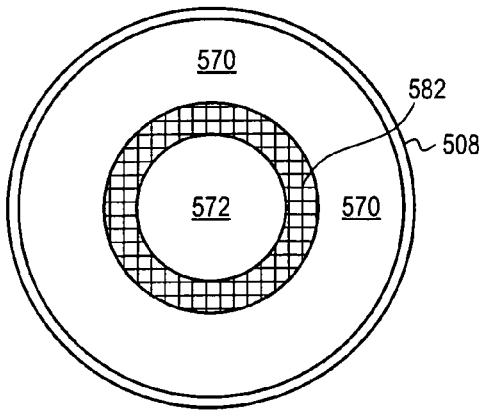
FIGS. 7A-7F show example cross-sections of the fuel rail assemblies of FIGS. 5 and 6.
Figure 7B:
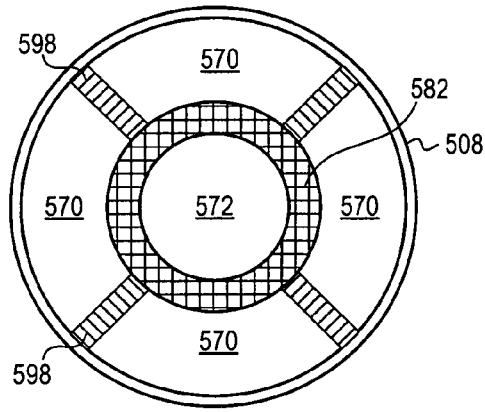

FIG. 7A shows an example cross-section of fuel rail assembly 500, including fuel rail housing 510, fuel mixture region 570, fuel separation membrane element 582, and fuel separation region 572. In this example, the fuel rail wall and fuel separation membrane element each have circular cross-sections. However, in other examples, the fuel rail wall and/or fuel separation membrane element may have any suitable cross-section. FIG. 7B shows an example cross-section through support 598 at a different location along the length of fuel rail assembly 500 than the cross-section shown in FIG. 7A. FIG. 7B illustrates how support 598 can be disposed between the membrane element and the fuel rail wall and the membrane element, and may have various openings indicated at 570 for permitting fuel to flow longitudinally along the length of the fuel rail. It should be appreciated that the shape of support 598 as shown in FIG. 7B is merely one example and that other suitable shapes may be used.

Figure 7C:
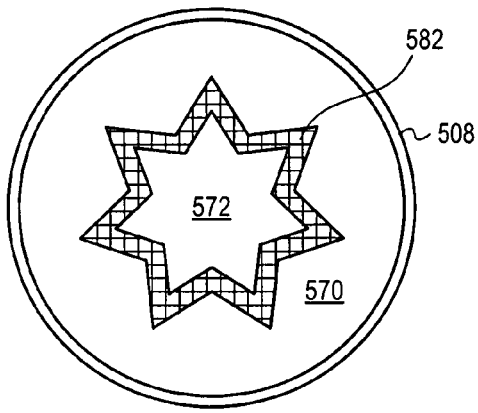
Figure 7D:
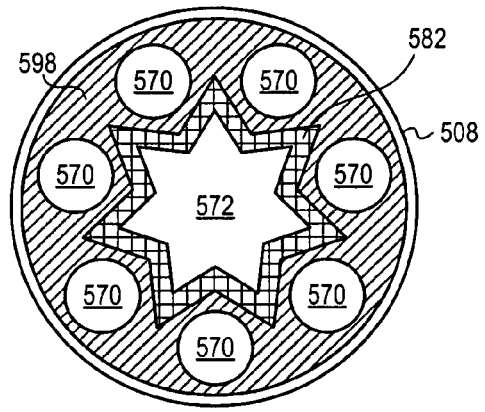

FIGS. 7C and 7D show other example cross sections for fuel rail assembly 500. The inventors herein have recognized that by increasing the surface area of the fuel separation membrane element, the separation rate of the permeant from the fuel mixture may be increased. Thus, the example of FIGS. 7C and 7D show how the membrane element may include a plurality of sides and/or folds that serve to increase the surface area of the membrane element relative to the internal volume of region 572 contained within the membrane element. FIG. 7D also shows an example cross-section through support 598 at a different location along the length of fuel rail assembly 500 than the cross-section shown in FIG. 7C. FIG. 7D illustrates how support 598 can be disposed between the membrane element and the fuel rail wall and the membrane element, and may have various openings indicated at 570 for permitting fuel to flow longitudinally along the length of the fuel rail.

Figure 7E:
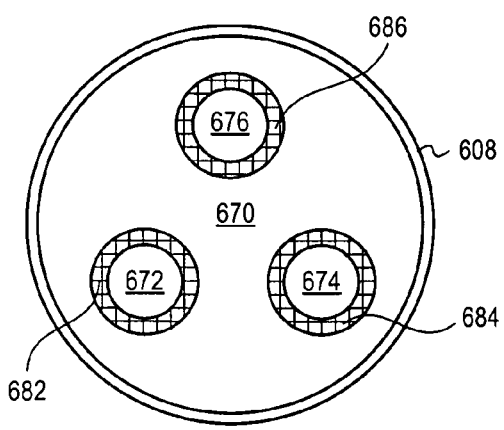
Figure 7F:
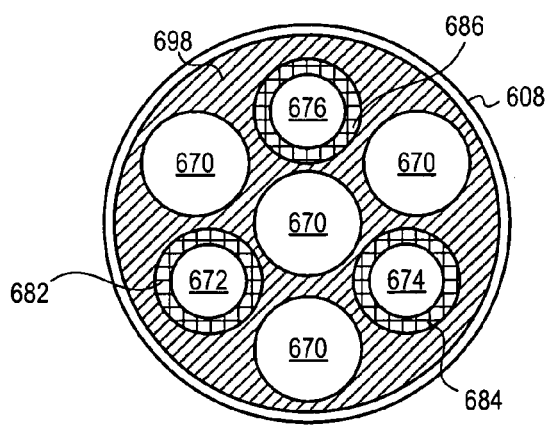

FIG. 7E shows yet another example cross-section for fuel rail assembly 600, which includes multiple independent permeant receiving regions, defined by separation membrane elements 682, 684, and 686. Note that other fuel rail assemblies may include other suitable numbers of fuel separation membrane elements to achieve a prescribed fuel separation rate. By increasing the quantity of fuel separation membrane elements that define distinct fuel separation regions, the total surface area of the membrane elements may be increased for a given volume of the permeation region, thereby increasing the separation rate of the permeant. Furthermore, by utilizing membrane element tubes having a relatively smaller cross-sectional area, circumference, or diameter, the ring stress in the support structure of the membrane elements can be reduced, thereby allowing a reduction in wall thickness which can further increase permeation rate. Fuel rail wall 608 is shown surrounding region 670. Membrane elements 682, 684, and 686 are shown as having a circular cross section defining regions 672, 674, and 676, respectively. Note that membrane elements 682, 684, and 686 can have other suitable shapes. Furthermore, in some examples, at least one or more of the membrane elements can have a different shape than another membrane element of the same fuel rail assembly. FIG. 7F shows an example cross-section through support 698 at a different position along the longitudinal length of the fuel rail assembly than the cross-section of FIG. 7E. FIG. 7E illustrates how support 598 can be disposed between the membrane element and the fuel rail wall and the membrane element, and may have various openings indicated at 670 for permitting fuel to flow longitudinally along the length of the fuel rail.

Figure 8:
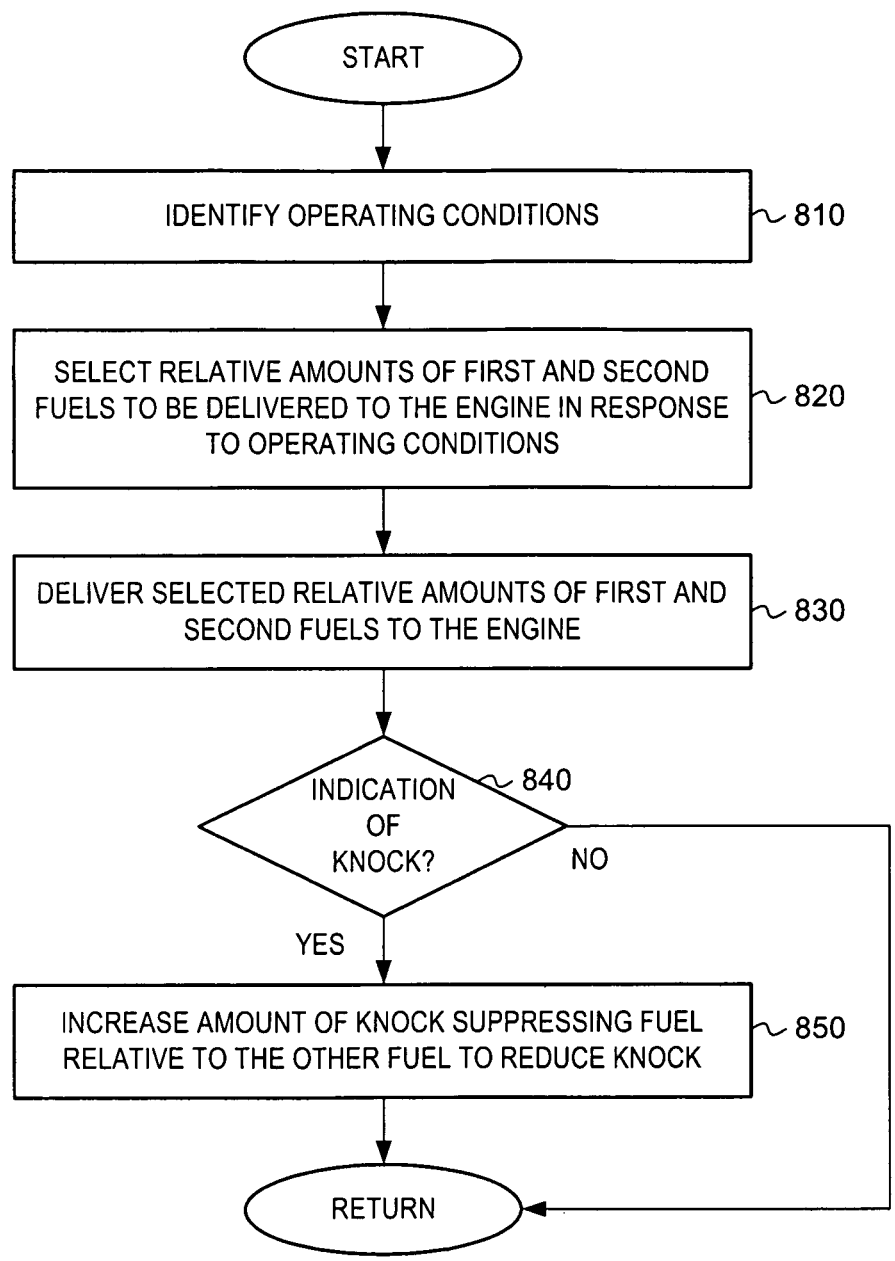
FIG. 8 shows a flow chart depicting an example fuel delivery control strategy.

FIG. 8 shows a flow chart depicting an example routine for controlling the relative amount of the first and the second fuels that are delivered to the engine. At 810, operating conditions can be identified. As one example, control system 190 can identify operating conditions associated with the engine or engine system via one or more of the previously described sensors. Operating conditions may include one or more of the following: engine speed, engine load, boost pressure, engine temperature, ambient air temperature and pressure, exhaust temperature, intake or exhaust valve timing, throttle position, fuel mixture amount and composition stored on-board the vehicle, permeant amount and/or composition that has been separated from the fuel mixture, pressure of fuel mixture within fuel rail assembly 130, pressure of permeant within fuel rail 160, an indication of knock provided by a knock sensor, vehicle/engine operator input, exhaust catalyst conditions, and fuel pump conditions, among others.

Figure 10:
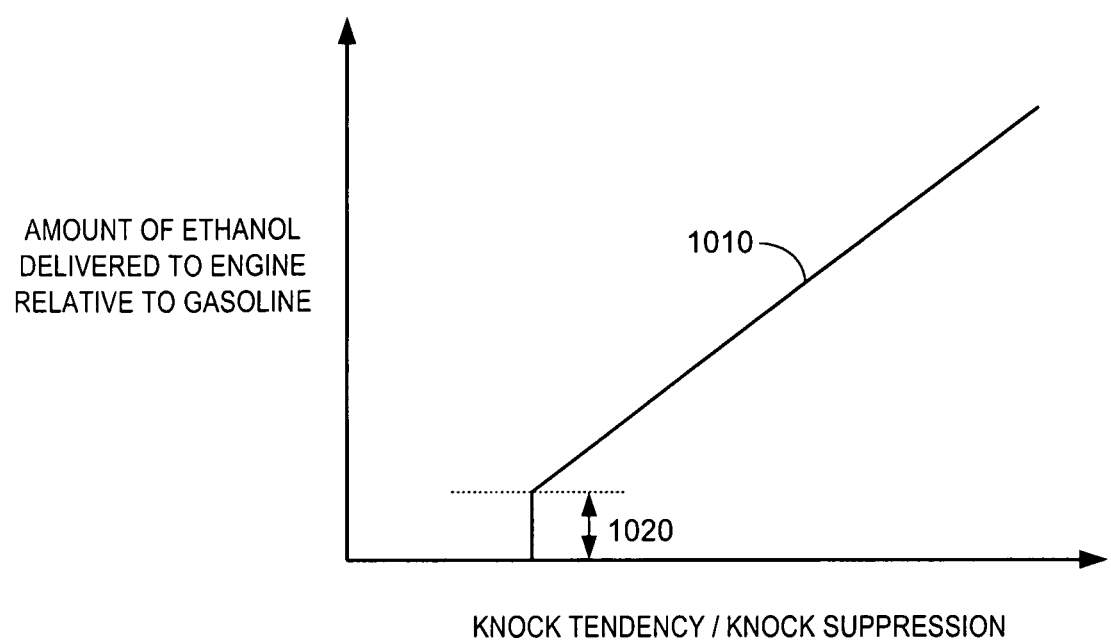
FIG. 10 shows a control map depicting how fuel delivery can be varied in response to operating conditions.

At 820, the relative amounts of the first and second fuels to be delivered to the engine can be selected in response to the operating conditions identified at 810. As one example, control system 190 can reference a look-up table, map, or suitable fuel selection function stored in memory. An example map is shown in FIG. 10 for selecting a relative amount of gasoline and ethanol to be delivered to the engine in response to various operating conditions. As one non-limiting example, where the permeant that is separated from the fuel mixture includes a higher concentration of alcohol than the fuel mixture, then the amount of the permeant delivered to the engine relative to the retained components of the fuel mixture can be increased in order to reduce engine knock. Thus, the amount of the alcohol component that is delivered to the engine can be increased relative to the amount of the hydrocarbon component in response to operating conditions that increase the tendency for engine knock. These operating conditions may include engine load, engine speed, and/or boost pressure, for example, among others.

At 830, the relative amounts of the first and second fuels that were selected at 820 can be delivered to the engine at 830. For example, the control system can control the fuel injectors to provide the prescribed relative amounts of each fuel type to the various engine cylinders. As shown in FIG. 3, injector 367 can inject the permeant and injector 366 can inject the portion of the fuel mixture that was retained by the membrane element, where the permeant can include a greater concentration of alcohol than the fuel injected by injector 366. In some examples, the control system can utilize feedback control from an exhaust gas sensor to adjust the relative amounts of the two fuels actually delivered to the engine based on the relative amounts prescribed by the control system.

At 840, it can be judged whether there is an indication of knock. As one example, the control system can receive an indication of engine knock from a knock indicating sensor shown at 396 in FIG. 3. If the answer at 840 is yes, the amount of a knock suppressing fuel (e.g. the alcohol component) delivered to the engine can be increased relative to the other fuel type (e.g. the hydrocarbon component) at 850. For example, the control system can increase the amount of the permeant that is delivered to the engine (e.g. via injector 367 as indicated at 180) relative to the amount of the remaining fuel mixture retained by the membrane element (e.g. via injector 366 as indicated at 170) in order to reduce engine knock.

Note that the amounts of the first and second fuels delivered to the engine via 170 and 180, for example, may be adjusted based on various operating conditions, such as engine operating conditions as noted above, separation performance, ambient conditions, etc. In one example, the amounts of the first and second fuels may be adjusted responsive to exhaust air-fuel ratio. Further, the selection of whether to adjust the first and/or second fuel based on exhaust air-fuel ratio may be informed by performance of the separation, such as based on fuel rail pressure and/or fuel rail temperature. In this way, improved air-fuel control may be obtained.

Figure 9:
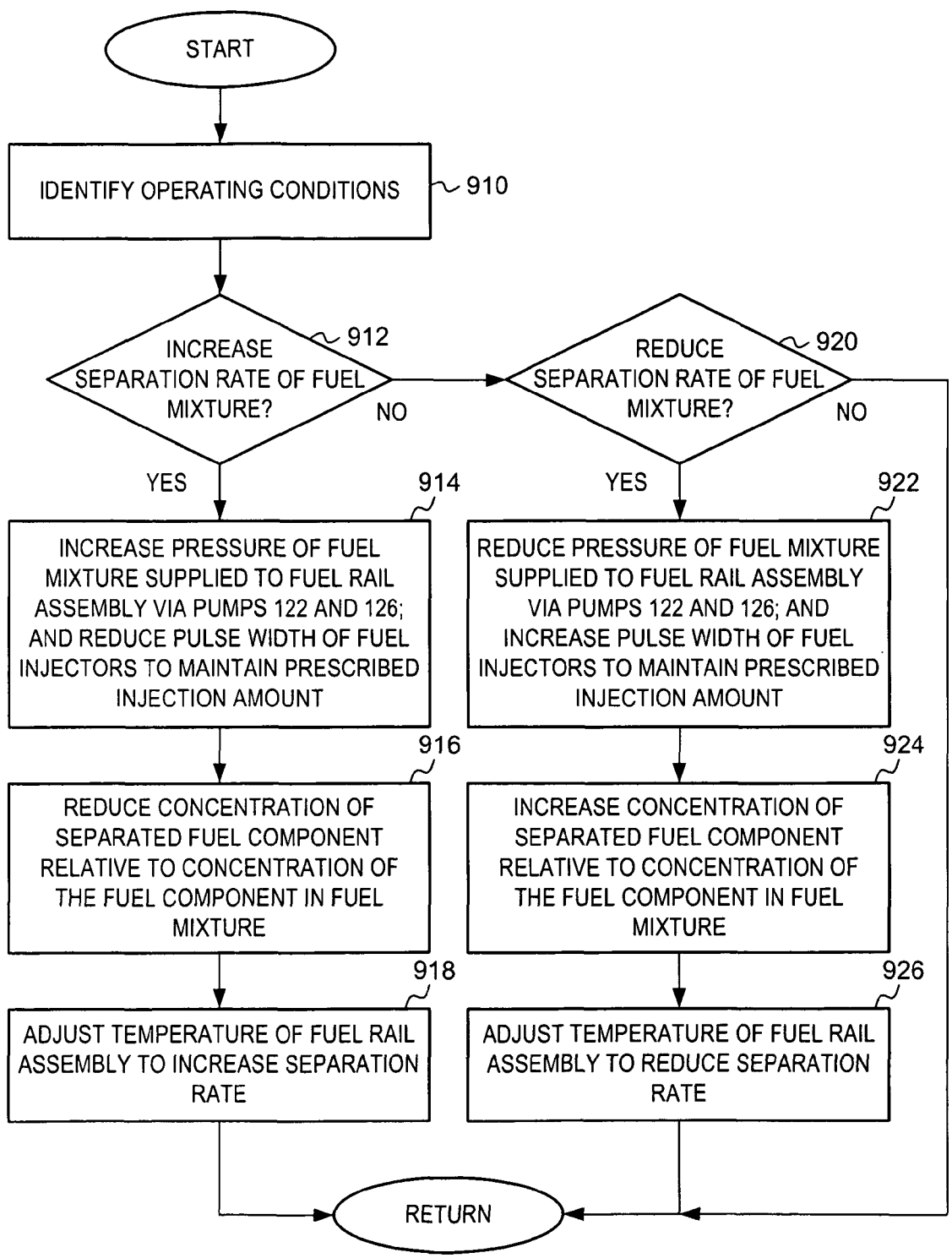
FIG. 9 shows a flow chart depicting an example fuel separation control strategy.

Referring now to FIG. 9, a flow chart is shown depicting an example control routine for controlling the separation rate of at least one fuel component from a fuel mixture via membrane element containing fuel rail assemblies described herein. At 910, operating condition can be identified as previously described at 810.

At 912, it may be judged whether to increase the separation rate of the fuel mixture. As one non-limiting example, the control system may decide to increase the separation rate of the fuel mixture to obtain an increased supply rate of the alcohol rich permeant. The control system can receive feedback as to the amount and/or concentration of the separated permeant fuel that is available to the engine via sensors 153 and 155. The control system can also consider the current and/or predicted usage rates of the permeant based on the identified operating conditions. For example, where the engine is operated by the vehicle operator such that the alcohol rich permeant fuel is supplied to the engine at a relatively higher rate in order to reduce knock tendency, the control system can correspondingly increase the separation rate of the fuel mixture so that a sufficient quantity of the alcohol rich component is available for delivery to the engine. As one example, the control system may reference a look-up table, map, or function stored in memory to determine an appropriate separation rate based on the usage rate of the fuel as judged from the operating conditions identified at 810 or 910.

If the answer at 912 is yes, the routine can proceed to 914. At 914, the pressure of the fuel mixture supplied to the fuel rail assembly may be increased by the control system by increasing the amount of pump work provided by pumps 122 and/or 126. For example, the control system can increase the speed of the motor driving pump 122 and/or increase the effective volume of each pump stroke of pump 126. Additionally, the control system can adjust the pulse width of the fuel injectors associated with the fuel rail assembly (e.g. injector 366) to maintain the prescribed injection amount identified using the routine of FIG. 8, even in response to the pressure increase. For example, where the fuel pressure of the fuel rail assembly is increased, namely the fuel pressure within region 133 of the fuel rail assembly, the pulse width of the fuel injectors may be reduced to correspond to the prescribed injection amount.

At 916, the concentration of the permeant vapor within region 135 of the fuel rail assembly can be reduced by increasing the removal rate from the fuel rail assembly vapor passage 138. In other words, the control system can increase the concentration gradient of the alcohol component across the membrane element in order to increase the rate of permeation and hence increasing the rate of separation.

At 918, the temperature of the fuel rail assembly can be adjusted to increase the separation rate of the permeant from the fuel mixture. For example, the control system can increase or decrease the amount of heat produced by the engine, the engine coolant flow rate, and/or other suitable cooling parameters in order to increase the separation rate provided by the fuel rail assembly.

Alternatively, if the answer at 912 is no, the routine can proceed to 920. At 920 it can be judged whether to reduce the separation rate of the fuel mixture. The considerations used by the control system for the decision at 912 can be similar to those applied at the decision at 920. For example, if the engine is operated such that the use of permeant is reduced or discontinued and the permeant storage tank has a sufficient amount of permeant, then the control system may reduce the separation rate. If the answer at 920 is yes, the routine can proceed to 922. Alternatively, if the answer at 922 is no, the routine can return.

At 922, the pressure of the fuel mixture supplied to the fuel rail assembly can be reduced by the control system by adjusting pumps 122 and/or 126. Additionally, the pulse width of the fuel injectors associated with the fuel rail assembly (e.g. injector 366) can be increased in response to the pressure reduction to maintain the same effective fuel delivery amount.

At 924, the concentration of the permeant vapor within region 135 can be increased by reducing the removal rate and/or condensation rate of the permeant vapor from region 135. In other words, the control system can adjust the condenser pump and/or the heat exchanger to reduce the concentration gradient across the membrane element, thereby reducing the separation rate of the fuel mixture. At 926, the temperature of the fuel rail assembly can be adjusted in an appropriate direction to reduce the separation rate of the fuel mixture. From either of 918 and 926, the routine can return.

FIG. 10 shows a graph or map depicting an example strategy for controlling the relative amounts of an alcohol rich fuel such as ethanol and a hydrocarbon rich fuel such as gasoline that are delivered to the engine for a range of operating conditions affecting engine knock. The horizontal axis of the graph represents knock tendency or the level of knock suppression necessary to reduce or eliminate engine knock. The vertical axis of the graph represents the amount of ethanol delivered to the engine relative to gasoline. When the knock tendency is relatively low, the amount of ethanol delivered to the engine relative to gasoline can be reduced or minimized. For example, where there is low knock tendency, only injector 366 may be operated to deliver the fuel mixture that has been retained by the membrane element to the cylinder. As the knock tendency is increased by increasing the engine speed, engine load, and/or boost pressure provided by a boosting device, the amount of ethanol provided to the engine can be increased relative to the amount of gasoline by increasing the amount of the permeant that is injected via injector 367. As indicated at 1020, this increase in permeant injection may include an amount that corresponds to a minimum pulse width of the injector (e.g. injector 367). As indicated at 1010, the amount of ethanol delivered to the engine may be increased relative to the amount of gasoline as the engine speed, engine load, and/or boost pressure continues to increase. For example, the control system can increase the amount of the permeant delivered to the engine relative to the amount of the fuel mixture that was retained by the membrane element. In this way, the control system can control the relative amounts of the different fuels, previously derived from a common fuel mixture, that are delivered to the engine in response to operating conditions to reduce engine knock.

The invention claimed is:

1. A fuel rail assembly for supplying pressurized fuel to a plurality of cylinders of an engine, comprising:
    fuel rail housing defining an internal fuel rail volume having at least a first region and a second region;
    a fuel separation membrane element disposed within the fuel rail housing and segregating the first region from the second region, said membrane element configured to pass a first component of a fuel mixture through the membrane element from the first region to the second region at a higher rate than a second component of the fuel mixture;
    a fuel inlet disposed on the fuel rail housing, said fuel inlet configured to admit the fuel mixture to the first region;
    a plurality of fuel outlets disposed on the fuel rail housing, wherein each of said fuel outlets are configured to supply at least a portion of the fuel mixture from the first region to a respective one of said plurality of engine cylinders; and
    at least one membrane outlet disposed on the fuel rail housing and configured to supply at least a portion of the first component that has passed through the membrane element from the second region to a location external the fuel rail housing.

2. The assembly of claim 1, wherein the membrane element is shaped to be loaded in compression when the first region is pressurized with the fuel mixture.

3. The assembly of claim 2, wherein the first region substantially surrounds the second region within the fuel rail housing.

4. The assembly of claim 1, wherein the fuel rail housing forms a first tube and the membrane element forms a second tube internal the first tube.

5. The assembly of claim 4, wherein the first and second tubes each have an annular cross-section as viewed through a plane that is orthogonal to a longitudinal axis of the fuel rail assembly.

6. The assembly of claim 4, wherein the membrane element includes a membrane coating and a membrane substrate that supports the membrane coating, said coating forming an outer surface of the second tube.

7. The assembly of claim 6, wherein the coating utilizes at least one of molecule size exclusion and chemical selectivity to at least partially separate the first component from the second component of the fuel mixture.

8. The assembly of claim 7, wherein the coating includes a polymer material.

9. The assembly of claim 6, wherein the substrate includes a porous ceramic material.

10. The assembly of claim 9, wherein the ceramic material includes zirconia.

11. The assembly of claim 1, wherein the first component includes an alcohol and the second component includes a hydrocarbon.

12. The assembly of claim 1, further comprising, at least a second fuel separation membrane element disposed within the fuel rail housing and segregating the first region of the fuel rail volume from a third region of the fuel rail volume, said second membrane element configured to pass the first component through the second membrane element from the first region to the third region at a higher rate than the second component.

13. The assembly of claim 12, further comprising, at least a second membrane element outlet disposed on the fuel rail housing and configured to supply from the third region of the fuel rail volume, at least a portion of the first component of the fuel mixture that has passed through the second membrane element; and wherein the second region is segregated by the third region by at least said second membrane element.

14. A method of operating a fuel system for an internal combustion engine, comprising:
supplying a pressurized fuel mixture to a first fuel rail, said fuel mixture including a hydrocarbon component and an alcohol component;
separating at least a portion of the alcohol component from the fuel mixture by passing at least said portion of the alcohol component through a fuel separation membrane element disposed within the first fuel rail to obtain an alcohol reduced fuel mixture;
delivering the alcohol reduced fuel mixture from the first fuel rail to at least a cylinder of the engine via a first fuel injector fluidly coupled with the first fuel rail;
supplying the separated alcohol component from the first fuel rail to a second fuel rail; and
delivering the separated alcohol component from the second fuel rail to the cylinder via a second fuel injector fluidly coupled with the second fuel rail.

15. The method of claim 14, wherein the second fuel injector is configured as a direct in-cylinder fuel injector and wherein said delivering the alcohol fuel component to the cylinder includes directly injecting the alcohol fuel component into the cylinder via the second fuel injector.

16. The method of claim 15, wherein the first fuel injector is configured as a direct in-cylinder fuel injector and wherein said delivering the alcohol reduced fuel mixture to the cylinder includes directly injecting the alcohol reduced fuel mixture into the cylinder via the first fuel injector.

17. The method of claim 16, wherein said supplying a pressurized fuel mixture to the first fuel rail is performed via at least a first lower pressure fuel pump that is powered by an electric motor and a second higher pressure fuel pump that is powered by a mechanical output of the engine.

18. The method of claim 14, wherein said supplying a pressurized fuel mixture to the first fuel rail is performed via at least a first fuel pump; and wherein said supplying the separated alcohol component from the first fuel rail to the second fuel rail further comprises increasing pressurization of the separated alcohol component via a second fuel pump.

19. The method of claim 14, wherein said supplying the separated alcohol component from the first fuel rail to the second fuel rail further comprises condensing a vapor phase portion of the separated alcohol component to a liquid phase at a condensation tank before the separated alcohol component is supplied to the second fuel rail in the liquid phase.

20. The method of claim 14, further comprising: increasing intake air pressure supplied to the cylinder by boosting said intake air via a compression device; and increasing an amount of the alcohol component delivered to the cylinder relative to the hydrocarbon component in response to an increase of the intake air pressure supplied to the cylinder via the compression device.

21. The method of claim 14, further comprising, heating the first fuel rail with heat generated by the engine, and where the alcohol reduced component is delivered to a plurality of cylinders.

22. An engine system for a vehicle, comprising:
an internal combustion engine including a plurality of combustion chambers;
a fuel storage tank;
a first fuel rail defining an internal volume that includes a first region and a second region, said first fuel rail including a fuel inlet that communicates with the first region and a plurality of fuel outlets, wherein at least a first fuel outlet and a second fuel outlet of the first fuel rail each communicate with the first region, and at least a third fuel outlet of the first fuel rail communicates with the second region;
a fuel separation membrane element disposed within the first fuel rail and segregating the first region from the second region, said membrane element configured to pass a first component of a mixed fuel from the first region to the second region at a higher rate than a second component of the fuel mixture;
a first fuel passage fluidly coupling the fuel storage tank with the first region via the fuel inlet of the first fuel rail;
a first fuel pump arranged along the first fuel passage, said first fuel pump configured to pressurize the first region with the mixed fuel;
a first fuel injector fluidly coupled with the first region via the first fuel outlet of the first fuel rail, said first fuel injector configured to supply at least a portion of the mixed fuel to a first combustion chamber of the engine;
a second fuel injector fluidly coupled with the second region via the second fuel outlet of the first fuel rail, said second fuel injector configured to supply at least a portion of the mixed fuel to a second combustion chamber of the engine;
a second fuel rail including a fuel inlet and a plurality of fuel outlets;
a second fuel passage fluidly coupling the second region of the first fuel rail via the third fuel outlet to the fuel inlet of the second fuel rail; and
at least a third fuel injector fluidly coupled with a first outlet of the second fuel rail, said third fuel injector configured to supply at least a portion of the first component that has passed through the membrane to the first combustion chamber of the engine.

23. The system of claim 22, further comprising a second fuel pump arranged along the second fuel passage.

24. The system of claim 23, further comprising a condensation system arranged along the second fuel passage upstream of the second fuel pump, said condensation system configured to condense a vapor phase of at least the first fuel component that passes through the membrane into the second region into a liquid phase, wherein the condensation system includes a vapor condenser and a heat exchanger arranged downstream of the vapor condenser; and a second fuel storage tank arranged along the second fuel passage between the condensation system and the second fuel pump.

25. The system of claim 23, further comprising a third fuel pump arranged along the first fuel passage downstream of the first fuel pump, wherein the first fuel pump is an electrically powered lower pressure pump and the third fuel pump is an engine driven higher pressure pump.

26. The system of claim 22, further comprising a control system configured to adjust an amount of the first component that is supplied to the engine relative to the second component in response to engine load by varying a pulse width of at least one of the first and the third injectors; and wherein the first component is an alcohol and the second component is a hydrocarbon.

27. The system of claim 22, further comprising a boosting device fluidly coupled within an air intake passage of the engine and where an operating condition further includes a boost pressure provided to the engine by the boosting device.

28. The system of claim 22, wherein the first fuel rail and the second fuel rail are mounted on the engine.

29. A method of operating a fuel system for an internal combustion engine, comprising:
    supplying a pressurized fuel mixture to a fuel rail, said fuel mixture including a hydrocarbon component and an alcohol component;
    separating at least a portion of the alcohol component from the fuel mixture by passing at least said portion of the alcohol component through a fuel separation membrane element disposed within the fuel rail to obtain an alcohol reduced fuel mixture;
    delivering the alcohol reduced fuel mixture from the fuel rail to at least a plurality of cylinders of the engine via injectors fluidly coupled with the first fuel rail;
    supplying the separated alcohol component to the engine.

30. The method of claim 29 where the separated alcohol component is delivered in a vapor phase to the engine.

31. The method of claim 29 where the separated alcohol component is delivered in a pressurized liquid phase to the engine.

32. The method of claim 29 where the injectors are coupled directly to the fuel rail.

33. The method of claim 29 further comprising pressurizing the fuel mixture with a high pressure fuel pump.

34. The method of claim 29 where a pressure of the pressurized fuel mixture is adjusted responsive to an exhaust gas oxygen amount.

35. A method of operating a fuel system for an internal combustion engine, comprising:
    supplying a pressurized fuel mixture to a fuel rail, said fuel mixture including a hydrocarbon component and an alcohol component;
    separating at least a portion of the alcohol component from the fuel mixture by passing at least said portion of the alcohol component through a fuel separation membrane element disposed within the fuel rail to obtain an alcohol reduced fuel mixture;
    delivering at least a portion of the alcohol reduced fuel mixture from the fuel rail to at least a plurality of cylinders of the engine via injectors fluidly coupled with the first fuel rail;
    supplying at least a portion of the separated alcohol component to the engine; and
    adjusting at least one of the delivery of the alcohol reduced fuel mixture and the supply of the separated alcohol component responsive to variation in engine operating conditions.

36. The method of claim 35 further comprising adjusting the delivery of the alcohol reduced fuel mixture responsive to exhaust air-fuel ratio.

37. The method of claim 35 further comprising adjusting supply of the separated alcohol component responsive to exhaust air-fuel ratio.

38. The method of claim 35 further comprising at least partially condensing the portion of separated alcohol component before supplying it to the engine, where the condensing is adjusted responsive to an operating condition.

* * * * *